United States Patent
Li et al.

(10) Patent No.: US 12,523,169 B2
(45) Date of Patent: Jan. 13, 2026

(54) HYDROGEN OXIDATION CATALYSTS FOR HYDROGEN-INTERNAL COMBUSTION ENGINE SYSTEMS

(71) Applicant: BASF MOBILE EMISSIONS CATALYSTS LLC, Iselin, NJ (US)

(72) Inventors: Yuejin Li, Iselin, NJ (US); Olga Gerlach, Heidelberg (DE); Andreas Sundermann, Heidelberg (DE)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 0 days.

(21) Appl. No.: 18/862,016

(22) PCT Filed: May 16, 2023

(86) PCT No.: PCT/EP2023/063158
§ 371 (c)(1),
(2) Date: Oct. 31, 2024

(87) PCT Pub. No.: WO2023/222715
PCT Pub. Date: Nov. 23, 2023

(65) Prior Publication Data
US 2025/0179952 A1    Jun. 5, 2025

(30) Foreign Application Priority Data
May 17, 2022    (EP) .................................... 22173903

(51) Int. Cl.
*F01N 3/10* (2006.01)
*B01J 20/04* (2006.01)
(Continued)

(52) U.S. Cl.
CPC .............. *F01N 3/106* (2013.01); *B01J 23/42* (2013.01); *B01J 29/06* (2013.01); *F01N 3/108* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2002/0038542 A1* | 4/2002 | Akama | C01B 3/386 60/285 |
| 2010/0000202 A1* | 1/2010 | Fisher | F01N 3/208 60/274 |

(Continued)

FOREIGN PATENT DOCUMENTS

WO    2018/073750 A1    4/2018

OTHER PUBLICATIONS

International Search Report and Written Opinion from corresponding PCT International Application No. PCT/EP2023/063158 dated Aug. 9, 2023.
(Continued)

*Primary Examiner* — Binh Q Tran
(74) *Attorney, Agent, or Firm* — DLA Piper LLP (US)

(57) ABSTRACT

An emission treatment system comprising a hydrogen oxidation catalyst, the use of the catalyst for oxidizing hydrogen gas in an emission treatment system, and a method for heat generation in an engine exhaust system. The hydrogen oxidation catalyst is capable of increasing the downstream temperature to allow for a system providing enhanced $NO_x$ removal and decreased $N_2O$ emissions relative to comparable exhaust gas treatment systems.

10 Claims, 3 Drawing Sheets

(51) Int. Cl.
    *B01J 23/42*     (2006.01)
    *B01J 29/06*     (2006.01)
    *F01N 3/20*     (2006.01)

(52) U.S. Cl.
    CPC ............ *B01J 20/041* (2013.01); *F01N 3/206* (2013.01); *F01N 3/2066* (2013.01); *F01N 3/208* (2013.01); *F01N 2240/40* (2013.01); *F01N 2610/04* (2013.01); *F01N 2900/04* (2013.01); *F01N 2900/1616* (2013.01)

(56) References Cited

U.S. PATENT DOCUMENTS

| | | | |
|---|---|---|---|
| 2010/0251700 A1* | 10/2010 | Wan | F01N 3/0231 60/287 |
| 2014/0311428 A1* | 10/2014 | Miyagawa | F01N 3/106 123/3 |
| 2016/0298514 A1* | 10/2016 | Raux | F01N 3/106 |
| 2019/0242282 A1* | 8/2019 | Li | F01N 13/009 |
| 2020/0032689 A1* | 1/2020 | Sung | F01N 9/00 |

OTHER PUBLICATIONS

International Preliminary Report on Patentability from corresponding PCT International Application No. PCT/EP2023/063158 dated Nov. 28, 2024.

* cited by examiner

HOC: Hydrogen Oxidation Catalyst; NOC: NO oxidation catalyst;
SCR: Catalyst for Selective Catalytic Reduction of $NO_x$; AMOX: Selective $NH_3$ oxidation catalyst ns.
HYDROGEN OXIDATION CATALYSTS FOR HYDROGEN-INTERNAL COMBUSTION ENGINE SYSTEMS Disclosed herein are an emission treatment system comprising a hydrogen oxidation catalyst, the use of said catalyst for oxidizing hydrogen gas in an emission treatment system, and a method for heat generation in an engine exhaust system. The hydrogen oxidation catalysts are positioned in an upstream position and are capable of increasing the downstream temperature to provide enhanced NOx removal and decreased $N_2O$ emissions relative to comparable exhaust gas treatment systems.

NOx is a term used to describe various chemical species of nitrogen oxides, including nitrogen monoxide (NO), and nitrogen dioxide ($NO_2$), among others. The most effective $NO_x$ reductant technology continues to be urea (or $NH_3$)-SCR. One key problem for attaining high $NO_x$ reduction over selective catalytic reduction (SCR) catalysts is having an adequate exhaust temperature for the SCR reaction—this technology has a limited efficiency at temperatures lower than 200° C. One way to increase the low-temperature SCR efficiency is to convert some NO to $NO_2$ (with an optimal $NO_2/NO_x$ ratio of 0.5) on a NO oxidation catalyst. Unfortunately, the NO oxidation efficiency is very low below 250° C. even on the best catalyst available. Additionally, this can be a problem for heavy duty diesel on-road aftertreatment systems, wherein the SCR catalyst is positioned downstream of the other catalysts, such as a diesel oxidation catalyst (DOC) and a catalyzed soot filter (CSF). In such system configurations, the SCR catalyst experiences somewhat lower temperature conditions, which can inhibit the SCR reaction.

WO 2018/073750 A1 relates to emission treatment systems and catalytic articles for selectively reducing NOx compounds, wherein the systems comprise a hydrogen selective catalytic reduction article.

Since these exhaust characteristics create challenges for current diesel emission catalyst technology, there remains a need in the art for new catalyst systems to more effectively control $NO_x$ emissions at low temperatures, such as during engine cold-start, as well as to meet increasingly stringent environmental regulations. It would be beneficial to provide components for such systems that focus on reducing $NO_x$ and $N_2O$ emissions from exhaust treatment systems.

The present disclosure provides an emission treatment system for a combustion engine, comprising a hydrogen injector positioned upstream of a hydrogen oxidation catalyst (HOC) and an NO oxidation catalyst, wherein the hydrogen oxidation catalyst and the NO oxidation catalyst are combined, wherein the hydrogen oxidation catalyst comprises a platinum group metal supported on a zeolite.

HOCs catalyze an exothermic reaction between hydrogen ($H_2$) and oxygen ($O_2$). During $H_2$ oxidation by $O_2$, $H_2$ also reacts with NO present in the exhaust, resulting in $N_2O$ formation. On typical precious metal-based catalysts, such as Pt, more than 30% of converted NO goes to $N_2O$. $N_2O$ formation is especially favorable at low temperatures, where efficient $H_2$ oxidation is desired. $N_2O$ is a powerful greenhouse gas, and its formation should be minimized in automotive catalyst systems. The HOCs of the present disclosure have excellent low-temperature activity for this reaction but make less $N_2O$ byproduct. Without wishing to be bound by any theory, it is understood that the HOCs of the present disclosure oxidize the $H_2$ injected in front of it and generate heat that in turn increases the downstream temperature. In this manner, the downstream catalysts are capable of improved performance. The HOCs can thus be used as efficient exotherm catalysts to raise the inlet temperature of a downstream catalyst, such as an NO oxidation catalyst or an SCR catalyst, which will lead to more effective $NO_x$ removal from the exhaust systems.

The present disclosure further provides a method for heat generation in an engine exhaust system, the engine exhaust system comprising an emission treatment system, the method comprising injecting hydrogen gas into an emission treatment system comprising a hydrogen injector positioned upstream of a hydrogen oxidation catalyst at a temperature ranging from about 100° C. to about 250° C., allowing the hydrogen oxidation catalyst to oxidize the hydrogen gas, and raising the temperature of the engine exhaust system downstream of the hydrogen oxidation system, wherein the hydrogen oxidation catalyst comprises a platinum group metal supported on a zeolite, wherein the hydrogen oxidation catalyst is positioned upstream of one or more of a NO oxidation catalyst, a selective catalytic reduction (SCR) catalyst, an ammonia oxidation (AMOX) catalyst, or any combination thereof, and wherein an $N_2O$ formation of the emission treatment system is <30 ppm.

The present invention also relates to the use of a hydrogen oxidation catalyst for oxidizing hydrogen gas in an emission treatment system comprising a hydrogen injector positioned upstream of the hydrogen oxidation catalyst, wherein an $N_2O$ formation of the emission treatment system is <30 ppm, and wherein the hydrogen oxidation catalyst comprises a platinum group metal supported on a zeolite.

BRIEF DESCRIPTION OF THE FIGURES

In order to provide an understanding of the embodiments of the present disclosure, reference is made to the appended figures. The figures are exemplary and should not be construed as limiting the disclosure.

Figure 1:
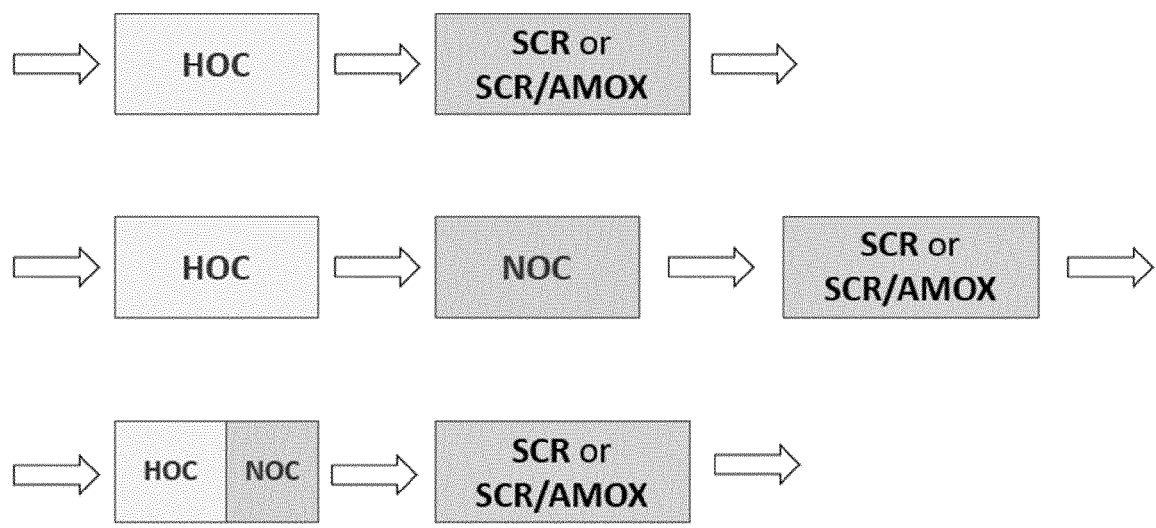
FIG. 1 shows various embodiments of the hydrogen oxidation catalyst (HOC) of the present disclosure in different configurations in an emission control system.

The present disclosure will now be described more fully. However, the disclosure may be embodied in many different forms and should not be construed as limited to the embodiments set forth herein.

As used herein, "a" or "an" entity refers to one or more of that entity, e.g., "a catalyst" refers to one or more catalysts or at least one catalyst unless stated otherwise. As such, the terms "a" (or "an"), "one or more", and "at least one" are used interchangeably herein.

As used herein, the term "about" means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%.

It was surprisingly found in the present disclosure that while most catalysts have a correlation between the amount of H$_2$ oxidation and N$_2$O formation, the catalysts of the present disclosure surprisingly show high H$_2$ conversion and low N$_2$O formation.

In embodiments, there is provided an emission treatment system for a combustion engine, comprising a hydrogen injector positioned upstream of a hydrogen oxidation catalyst and an NO oxidation catalyst, wherein the hydrogen oxidation catalyst and the NO oxidation catalyst are combined, wherein the hydrogen oxidation catalyst comprises a platinum group metal supported on a zeolite.

In some embodiments, the N$_2$O formation of the emission treatment system is <30 ppm.

In embodiments, there is provided a method for heat generation in an engine exhaust system, the engine exhaust system comprising an emission treatment system, the method comprising injecting hydrogen gas into an emission treatment system comprising a hydrogen injector positioned upstream of a hydrogen oxidation catalyst at a temperature ranging from about 100° C. to about 250° C., allowing the hydrogen oxidation catalyst to oxidize the hydrogen gas, and raising the temperature of the engine exhaust system downstream of the hydrogen oxidation system, wherein the hydrogen oxidation catalyst comprises a platinum group metal supported on a zeolite, wherein the hydrogen oxidation catalyst is positioned upstream of one or more of a NO oxidation catalyst, a selective catalytic reduction (SCR) catalyst, an ammonia oxidation (AMOX) catalyst, or any combination thereof, and wherein an N$_2$O formation of the emission treatment system is <30 ppm.

In some embodiments, in the above method, the emission treatment system comprises the hydrogen oxidation catalyst and an NO oxidation catalyst, and the hydrogen oxidation catalyst and the NO oxidation catalyst are combined.

In some embodiments, in the above method, the H$_2$ conversion of the hydrogen oxidation catalyst is in a range of 80-100%.

In some embodiments, in the above method, an inlet H$_2$ concentration into the emission treatment system is from 0.1 to 2%.

An embodiment relates to the use of a hydrogen oxidation catalyst for oxidizing hydrogen gas in an emission treatment system comprising a hydrogen injector positioned upstream of the hydrogen oxidation catalyst, wherein an N$_2$O formation of the emission treatment system is <30 ppm, and wherein the hydrogen oxidation catalyst comprises a platinum group metal supported on a zeolite.

In some embodiments relating to the use of said hydrogen oxidation catalyst, the H$_2$ conversion of the hydrogen oxidation catalyst is in a range of 80-100%.

In some embodiments relating to the use of said hydrogen oxidation catalyst, the emission treatment system comprises the hydrogen oxidation catalyst and an NO oxidation catalyst, and the hydrogen oxidation catalyst and the NO oxidation catalyst are combined.

hydrogen oxidation catalyst for exhaust gas treatment of hydrogen from a combustion engine comprising a platinum group metal supported on a zeolite.

In some embodiments, the platinum group metal is chosen from Pt, Pd, rhodium (Rh), ruthenium (Ru), iridium (Ir), and combinations thereof. In some embodiments, the platinum group metal is Pt. In some embodiments, the platinum group metal is Pd. In some embodiments, the platinum group metal is a combination of Pt and Pd. In some embodiments, the platinum group metal is Rh. In some embodiments, the platinum group metal is Ru. In some embodiments, the platinum group metal is Ir. In some embodiments, the platinum group metal is a combination of Pt and Rh. In some embodiments, the platinum group metal is a combination of Pt and Ru. In some embodiments, the platinum group metal is a combination of Pt and Ir. In some embodiments, the platinum group metal is a combination of Pd and Rh. In some embodiments, the platinum group metal is a combination of Pd and Ru. In some embodiments, the platinum group metal is a combination of Pd and Ir. In some embodiments, the platinum group metal is a combination of Rh and Ru. In some embodiments, the platinum group metal is a combination of Rh and Ir. In some embodiments, the platinum group metal is a combination of Ru and Ir.

In some embodiments, the zeolite is an H-form of zeolite chosen from structures comprising FAU, MOR, CHA, FER, *BEA, MFI, (Al$_2$O$_3$+MFI)+TiO$_2$, and combinations thereof. In some embodiments, the zeolite structure is FAU. In some embodiments, the zeolite structure is MOR. In some embodiments, the zeolite structure is CHA. In some embodiments, the zeolite structure is FER. In some embodiments, the zeolite structure is *BEA. In some embodiments, the zeolite structure is MFI. In some embodiments, the zeolite structure is (Al$_2$O$_3$+MFI)+TiO$_2$.

In some embodiments, the zeolite structure is a combination of FAU and MOR. In some embodiments, the zeolite structure is a combination of FAU and CHA. In some embodiments, the zeolite structure is a combination of FAU and FER. In some embodiments, the zeolite structure is a combination of FAU and *BEA. In some embodiments, the zeolite structure is a combination of FAU and MFI. In some embodiments, the zeolite structure is a combination of FAU and (Al$_2$O$_3$+MFI)+TiO$_2$. In some embodiments, the zeolite structure is a combination of MOR and CHA. In some embodiments, the zeolite structure is a combination of MOR and FER. In some embodiments, the zeolite structure is a combination of MOR and *BEA. In some embodiments, the zeolite structure is a combination of MOR and MFI. In some embodiments, the zeolite structure is a combination of MOR and (Al$_2$O$_3$+MFI)+TiO$_2$. In some embodiments, the zeolite structure is a combination of CHA and FER. In some embodiments, the zeolite structure is a combination of CHA and *BEA. In some embodiments, the zeolite structure is a combination of CHA and MFI. In some embodiments, the zeolite structure is a combination of CHA and (Al$_2$O$_3$+MFI)+TiO$_2$. In some embodiments, the zeolite structure is a combination of FER and *BEA. In some embodiments, the zeolite structure is a combination of FER and MFI. In some embodiments, the zeolite structure is a combination of FER and (Al$_2$O$_3$+MFI)+TiO$_2$. In some embodiments, the zeolite structure is a combination of *BEA and MFI. In some embodiments, the zeolite structure is a combination of *BEA and (Al$_2$O$_3$+MFI)+TiO$_2$. In some embodiments, the zeolite structure is a combination of MFI and (Al$_2$O$_3$+MFI)+TiO$_2$.

In some embodiments, the hydrogen oxidation catalyst is selected from the group consisting of Pd/Al$_2$O$_3$, Pd/H—Y, Pd/H-ZSM-5, Pd/H-Beta, Pd/MgO, Pd/SiO$_2$/Al$_2$O$_3$, Pd/WO$_3$/ZrO$_2$, Pd/ZrO$_2$, Pd/MgO—CeO$_2$, Pd/(Al$_2$O$_3$+ZSM-5)+TiO$_2$, Pd/SiO$_2$, Pt/H-ZSM-5, and Pt/H-CHA.

In some embodiments, the hydrogen oxidation catalyst is chosen from Pd/H—Y, Pd/H-ZSM-5, Pd/H-Mordenite, Pd/H-Beta, Pd/H-Chabazite, Pd/H-Ferrierite, Pd/(Al$_2$O$_3$+ZSM-5)+TiO$_2$, Pt/H—Y, Pt/H-ZSM-5, Pt/H-Mordenite, Pt/Beta, Pt/H-Chabazite, Pt/H-Ferrierite, Pt/(Al$_2$O$_3$+ZSM-5)+TiO$_2$, PtPd/H—Y, PtPd/H-ZSM-5, PtPd/H-Mordenite, PtPd/H-Beta, PtPd/H-Chabazite, PtPd/H-Ferrierite, and PtPd/(Al$_2$O$_3$+ZSM-5)+TiO$_2$.

In some embodiments, the hydrogen oxidation catalyst is Pd/H—Y. In some embodiments, the hydrogen oxidation catalyst is Pd/H-ZSM-5. In some embodiments, the hydrogen oxidation catalyst is Pd/H-Mordenite. In some embodiments, the hydrogen oxidation catalyst is Pd/H-Beta. In some embodiments, the hydrogen oxidation catalyst is Pd/H-Chabazite. In some embodiments, the hydrogen oxidation catalyst is Pd/H-Ferrierite. In some embodiments, the hydrogen oxidation catalyst is Pd/($Al_2O_3$+ZSM-5)+$TiO_2$. In some embodiments, the hydrogen oxidation catalyst is Pt/H—Y. In some embodiments, the hydrogen oxidation catalyst is Pt/H-ZSM-5. In some embodiments, the hydrogen oxidation catalyst is Pt/H-Mordenite. In some embodiments, the hydrogen oxidation catalyst is Pt/H-Beta. In some embodiments, the hydrogen oxidation catalyst is Pt/H-Chabazite. In some embodiments, the hydrogen oxidation catalyst is Pt/H-Ferrierite. In some embodiments, the hydrogen oxidation catalyst is Pt/($Al_2O_3$+ZSM-5)+$TiO_2$. In some embodiments, the hydrogen oxidation catalyst is PtPd/H—Y. In some embodiments, the hydrogen oxidation catalyst is PtPd/H-ZSM-5. In some embodiments, the hydrogen oxidation catalyst is PtPd/H-Mordenite. In some embodiments, the hydrogen oxidation catalyst is PtPd/H-Beta. In some embodiments, the hydrogen oxidation catalyst is PtPd/H-Chabazite. In some embodiments, the hydrogen oxidation catalyst is PtPd/H-Ferrierite. In some embodiments, the hydrogen oxidation catalyst is PtPd/($Al_2O_3$+ZSM-5)+$TiO_2$.

In some embodiment, the Pt: Pd weight ratio is chosen from 8:1, 4:1, and 2:1. In some embodiment, the Pt: Pd weight ratio is 8:1. In some embodiment, the Pt: Pd weight ratio is 4:1. In some embodiment, the Pt: Pd weight ratio is 2:1.

The present disclosure provides for a hydrogen oxidation catalyst for exhaust gas treatment of hydrogen from a combustion engine. In some embodiments, the hydrogen oxidation catalyst comprises platinum (Pt), palladium (Pd), or combinations thereof supported on an oxide or a mixed oxide.

In some embodiments, the oxide or the mixed oxide is chosen from $Al_2O_3$, $SiO_2$, $CeO_2$, $TiO_2$, $ZrO_2$, MgO, $WO_3$, and mixtures thereof. In some embodiments, the oxide or the mixed oxide is $Al_2O_3$. In some embodiments, the oxide or the mixed oxide is $SiO_2$. In some embodiments, the oxide or the mixed oxide is $CeO_2$. In some embodiments, the oxide or the mixed oxide is $TiO_2$. In some embodiments, the oxide or the mixed oxide is $ZrO_2$. In some embodiments, the oxide or the mixed oxide is MgO. In some embodiments, the oxide or the mixed oxide is $WO_3$. In some embodiments, the oxide or the mixed oxide is $Al_2O_3/SiO_2$. In some embodiments, the oxide or the mixed oxide is $Al_2O_3/CeO_2$. In some embodiments, the oxide or the mixed oxide is $Al_2O_3/TiO_2$. In some embodiments, the oxide or the mixed oxide is $Al_2O_3/ZrO_2$. In some embodiments, the oxide or the mixed oxide is $Al_2O_3$/MgO, $Al_2O_3/WO_3$. In some embodiments, the oxide or the mixed oxide is $SiO_2/CeO_2$. In some embodiments, the oxide or the mixed oxide is $SiO_2/TiO_2$. In some embodiments, the oxide or the mixed oxide is $SiO_2/ZrO_2$. In some embodiments, the oxide or the mixed oxide is $SiO_2$/MgO. In some embodiments, the oxide or the mixed oxide is $SiO_2/WO_3$. In some embodiments, the oxide or the mixed oxide is $CeO_2/TiO_2$. In some embodiments, the oxide or the mixed oxide is $CeO_2/ZrO_2$. In some embodiments, the oxide or the mixed oxide is $CeO_2$/MgO. In some embodiments, the oxide or the mixed oxide is $CeO_2/WO_3$. In some embodiments, the oxide or the mixed oxide is $TiO_2/ZrO_2$. In some embodiments, the oxide or the mixed oxide is $TiO_2$/MgO. In some embodiments, the oxide or the mixed oxide is $TiO_2/WO_3$. In some embodiments, the oxide or the mixed oxide is $ZrO_2$/MgO. In some embodiments, the oxide or the mixed oxide is $ZrO_2/WO_3$. In some embodiments, the oxide or the mixed oxide is MgO/$WO_3$.

In some embodiments, the hydrogen oxidation catalyst is chosen from Pd/$Al_2O_3$, Pd/MgO, Pd/$SiO_2/Al_2O_3$, Pd/$WO_3/ZrO_2$, Pd/$ZrO_2$, Pd/MgO—$CeO_2$, Pd/$SiO_2$, Pt/$Al_2O_3$, Pt/MgO, Pt/$SiO_2/Al_2O_3$, Pt/$WO_3/ZrO_2$, Pt/$ZrO_2$, Pt/MgO—$CeO_2$, Pt/$SiO_2$, PtPd/$Al_2O_3$, PtPd/MgO, PtPd/$SiO_2/Al_2O_3$, PtPd/$WO_3/ZrO_2$, PtPd/$ZrO_2$, PtPd/MgO—$CeO_2$, and PtPd/$SiO_2$.

In some embodiments, the hydrogen oxidation catalyst is Pd/$Al_2O_3$. In some embodiments, the hydrogen oxidation catalyst is Pd/MgO. In some embodiments, the hydrogen oxidation catalyst is Pd/$SiO_2/Al_2O_3$. In some embodiments, the hydrogen oxidation catalyst is Pd/$WO_3/ZrO_2$. In some embodiments, the hydrogen oxidation catalyst is Pd/$ZrO_2$. In some embodiments, the hydrogen oxidation catalyst is Pd/MgO—$CeO_2$. In some embodiments, the hydrogen oxidation catalyst is Pd/$SiO_2$. In some embodiments, the hydrogen oxidation catalyst is Pt/$Al_2O_3$. In some embodiments, the hydrogen oxidation catalyst is Pt/MgO. In some embodiments, the hydrogen oxidation catalyst is Pt/$SiO_2/Al_2O_3$. In some embodiments, the hydrogen oxidation catalyst is Pt/$WO_3/ZrO_2$. In some embodiments, the hydrogen oxidation catalyst is Pt/$ZrO_2$. In some embodiments, the hydrogen oxidation catalyst is Pt/MgO—$CeO_2$. In some embodiments, the hydrogen oxidation catalyst is Pt/$SiO_2$. In some embodiments, the hydrogen oxidation catalyst is PtPd/$Al_2O_3$. In some embodiments, the hydrogen oxidation catalyst is PtPd/MgO. In some embodiments, the hydrogen oxidation catalyst is PtPd/$SiO_2/Al_2O_3$. In some embodiments, the hydrogen oxidation catalyst is PtPd/$WO_3/ZrO_2$. In some embodiments, the hydrogen oxidation catalyst is PtPd/$ZrO_2$. In some embodiments, the hydrogen oxidation catalyst is PtPd/MgO—$CeO_2$. In some embodiments, the hydrogen oxidation catalyst is PtPd/$SiO_2$.

The present disclosure provides for an emission treatment system for a combustion engine. In some embodiments, the emission treatment system comprises a hydrogen injector positioned upstream of the hydrogen oxidation catalyst as disclosed in the present invention. In some embodiments, the hydrogen oxidation catalyst is positioned upstream of one or more of a NO oxidation catalyst, a selective catalytic reduction (SCR) catalyst, an ammonia oxidation (AMOX) catalyst, or any combination thereof.

In some embodiments, the hydrogen oxidation catalyst is positioned upstream of a NO oxidation catalyst. In some embodiments, the hydrogen oxidation catalyst and the NO oxidation catalyst are combined.

In some embodiments, the hydrogen oxidation catalyst is positioned upstream of a selective catalytic reduction (SCR) catalyst.

In some embodiments, the hydrogen oxidation catalyst is positioned upstream of an ammonia oxidation (AMOX) catalyst.

In some embodiments, the hydrogen oxidation catalyst is positioned upstream of a combination of a selective catalytic reduction (SCR) catalyst and an ammonia oxidation (AMOX) catalyst.

The present disclosure also provides for a method for heat generation in an engine exhaust system. In some embodiments, the method comprises injecting hydrogen gas into the emission treatment system as described herein. In some embodiments, the emission treatment system is at a temperature ranging from about 100° C. to about 250° C. In some embodiments, the emission treatment system is at a temperature of about 100° C. In some embodiments, the emission treatment system is at a temperature of about 110° C. In some embodiments, the emission treatment system is at a temperature of about 120° C. In some embodiments, the emission treatment system is at a temperature of about 130° C. In some embodiments, the emission treatment system is at a temperature of about 140° C. In some embodiments, the emission treatment system is at a temperature of about 150° C. In some embodiments, the emission treatment system is at a temperature of about 160° C. In some embodiments, the emission treatment system is at a temperature of about 170° C. In some embodiments, the emission treatment system is at a temperature of about 180° C. In some embodiments, the emission treatment system is at a temperature of about 190° C. In some embodiments, the emission treatment system is at a temperature of about 200° C. In some embodiments, the emission treatment system is at a temperature of about 210° C. In some embodiments, the emission treatment system is at a temperature of about 220° C. In some embodiments, the emission treatment system is at a temperature of about 230° C. In some embodiments, the emission treatment system is at a temperature of about 240° C. In some embodiments, the emission treatment system is at a temperature of about 250° C.

In some embodiments, the hydrogen oxidation catalyst oxidizes the hydrogen gas, and raising the temperature of the engine exhaust system downstream of the hydrogen oxidation system.

Before describing exemplary embodiments of the present disclosure, it is to be understood that the disclosure is not limited to the details of construction or process steps set forth in the following examples and is capable of other embodiments and of being practiced or being carried out in various ways.

EXAMPLES

The following examples are intended to be illustrative and are not meant in any way to limit the scope of the disclosure.

As illustrated in FIG. 1, the hydrogen oxidation catalyst (HOC) of the present disclosure can be configured into a variety of emission control systems, which include additional components such as a selective catalytic reduction (SCR) catalyst, a selective ammonia oxidation catalyst (AMOX) and/or an NO oxidation catalyst. For example, the emission control system can be configured as (i) HOC→SCR or SCR/AMOX; (ii) HOC→NOC→SCR or SCR/AMOX; or (iii) HOC/NOC→SCR or SCR/AMOX.

Catalyst Preparation Procedures
Preparation Method 1 (Single Metal Catalysts):

For Pt catalysts, a Pt amine hydroxide solution was impregnated onto a commercially available catalyst support using the incipient wetness technique to achieve a desirable metal loading. For Pd, Ru, Rh and Ir catalysts, the corresponding nitrate solutions were used for the impregnation. The impregnated metal/support powder was then calcined at 500° C. for 2 hours in air. To shape the sample for reactor test, the calcined powder was dispersed in deionized water at about 30% solid content, and in this slurry an alumina binder (5% of the catalyst) was added. This slurry was continuously stirred until dry. The dried powder was further calcined at 450° C. for 2 hours in air and then crushed and sieved to 250-500 micrometer fraction. Before reactor testing, the sieved fraction was aged at 750° C. for 20 hours with 10% steam in air.

Preparation Method 2 (Pt/Pd Catalysts);

For Pt/Pd bimetallic catalysts, Pd nitrate solution was first impregnated on a support powder to achieve 100% incipient wetness. This Pd impregnated powder was dried at 100° C. before Pt impregnation. Pt was then impregnated on this Pd/support powder using a method similar to Method 1 and dried at 100° C. The Pt/Pd powder was then calcined at 450° C. for 2 hours in air. The sample shaping method and aging conditions are the same as described in Method 1.

Preparation Method 3 (PGM on $TiO_2$—$ZrO_2$):

The $TiO_2$—$ZrO_2$ support was synthesized by co-precipitating $Ti(OPr)_4$ and $ZrO(NO_3)_2$ mixtures (Ti/Zr molar ratio=1:1) with $NH_4OH$ solution. The precipitated solution was then evaporated to dryness. The resulting solid product was calcined at 450° C. in air. Metal impregnation, sample shaping, and catalyst aging were performed in the same way as described in Method 1.

Preparation Method 4 (PGM on MgO—$CeO_2$):

MgO—$CeO_2$ support was prepared by the sol-gel method using Mg $(EtO)_2$ and Ce $(NO_3)_3$ as precursors (Mg/Ce molar ratio=1:1). The resulting solid was calcined at 600° C. for 4 hours in air. Pt or Pd impregnation was conducted using the same method described in Method 1. The sample shaping method and aging conditions are the same as described in Method 1.

Preparation Method 5 (PGM on Sulfated MgO—$CeO_2$):

Method 5 is same as Method 4, except a sulfation treatment was conducted before metal impregnation. The MgO—$CeO_2$ support was treated with a flowing stream of 20 ppm $SO_2$ in air at 300° C. for 20 hours. The sample shaping method and aging conditions are the same as described in Method 1.

Preparation Method 6 (PGM on $WO_3$/$ZrO_2$):

The support material, $WO_3$/$ZrO_2$ (10% $WO_3$), was made by impregnating $(NH_4)_6H_2W_{12}O_{41}$ solution onto a commercially available $ZrO_2$ support using the incipient wetness technique. The resulting powder was dried overnight at 110° C. in air and calcined at 500° C. for 2 hours before impregnating Pt or Pd. The sample shaping method and aging conditions are the same as described in Method 1.

Preparation Method 7 (Pd/($Al_2O_3$+ZSM-5)+$TiO_2$):

Pd/($Al_2O_3$+ZSM-5)+$TiO_2$ catalyst was prepared by impregnating Pd nitrate on a mixture of $Al_2O_3$ and ZSM-5 zeolite (3:1 by weight) using the procedure described in Method 1. To this Pd/($Al_2O_3$+ZSM-5) material, $TiO_2$ was added (20% $TiO_2$ by weight). The mixture was calcined at 500° C. for 2 hours in air. The sample shaping method and aging conditions are the same as described in Method 1.

Catalyst Performance Evaluation Procedures

Catalyst performance was evaluated with a high-throughput reactor under steady-state conditions. For each run, 0.2 g of sample was used with a flow rate of 50 L/min, which is equivalent a monolithic GHSV of 30,000 $h^{-1}$ assuming a 2 g/in$^3$ washcoat loading. Two types of measurements were conducted: (1) performance as a function of inlet hydrogen concentration and (2) performance as a function of reaction temperature. For type 1, the measurement was performed at 125° C. with feed gas consisting of variable $H_2$ (0.2, 0.4, 0.6, 0.8 and 1%), 200 ppm NO, 5% O2, 5% $H_2O$ and balance $N_2$. For type 2, the feed gas consisted of 1% $H_2$, 200 ppm NO, 5% $O_2$, 5% $H_2O$ and balance $N_2$, and the performance was measured at 100, 125, 150, 175 and 200, 250 and 350° C. $H_2$ conversion is defined as (Inlet $H_2$ concentration-Outlet $H_2$ concentration)/Inlet $H_2$ concentration x 100%.

Catalyst compositions of the present disclosure are described in Tables 1 and 2, shown below. The performances of the catalyst compositions of Table 1 are shown in Tables 3, Table 4, and FIG. 2. The performances of the catalyst compositions of Table 2 are shown in Table 5, Table 6 and FIG. 3.

TABLE 1

Sample Matrix I

| Catalyst ID | Metal | Support name/composition | Preparation method | Catalyst description |
|---|---|---|---|---|
| I-1 | 1% Pt | $Al_2O_3$ | Impregnation | 1% $Pt/Al_2O_3$ |
| I-2 | 1% Pt | $SiO_2$ | Impregnation | 1% $Pt/SiO_2$ |
| I-3 | 1% Pt | $CeO_2$ | Impregnation | 1% $Pt/CeO_2$ |
| I-4 | 1% Pt | $TiO_2$ | Impregnation | 1% $Pt/TiO_2$ |
| I-5 | 1% Pt | $ZrO_2$ | Impregnation | 1% $Pt/ZrO_2$ |
| I-6 | 1% Pt | $TiO_2$—$ZrO_2$ (1:1) | Impregnation | 1% $Pt/TiO_2$—$ZrO_2$ |
| I-7 | 1% Pt | 10% $WO_3$/90% $ZrO_2$ | Impregnation | 1% $Pt/WO_3/ZrO_2$ |
| I-8 | 1% Pt | 10% $WO_3$/90% $TiO_2$ | Impregnation | 1% $Pt/WO_3/TiO_2$ |
| I-9 | 1% Pt | 10% $SiO_2$/90% $Al_2O_3$ | Impregnation | 1% $Pt/SiO_2/Al_2O_3$ |
| I-10 | 1% Pt | MgO | Impregnation | 1% Pt/MgO |
| I-11 | 1% Pt | MgO—$CeO_2$ (1:1) | Impregnation | 1% Pt/MgO—$CeO_2$ |
| I-12 | 0.1% Pd | MgO—$CeO_2$ (1:1) | Impregnation | 0.1% Pd/MgO—$CeO_2$ |
| I-13 | 0.1% Pt | MgO—$CeO_2$ (1:1) | Impregnation | 0.1% Pt/MgO—$CeO_2$ |
| I-14 | 1% Pt | H-Y (SAR 30) | Impregnation | 1% Pt/H-Y |
| I-15 | 1% Pt | H-ZSM-5 (SAR 30) | Impregnation | 1% Pt/H-ZSM5 |
| I-16 | 1% Pt | H-Beta (SAR 25) | Impregnation | 1% Pt/H-Beta |
| I-17 | 1% Pt | H-CHA (SAR 29) | Impregnation | 1% Pt/H-CHA |
| I-18 | 1% Pd | $Al_2O_3$ | Impregnation | 1% $Pd/Al_2O_3$ |
| I-19 | 1% Pd | $SiO_2$ | Impregnation | 1% $Pd/SiO_2$ |
| I-20 | 1% Pd | $CeO_2$ | Impregnation | 1% $Pd/CeO_2$ |
| I-21 | 1% Pd | $TiO_2$ | Impregnation | 1% $Pd/TiO_2$ |
| I-22 | 1% Pd | $ZrO_2$ | Impregnation | 1% $Pd/ZrO_2$ |
| I-23 | 1% Pd | $TiO_2$—$ZrO_2$ (1:1) | Impregnation | 1% $Pd/TiO_2$-$ZrO_2$ |
| I-24 | 1% Pd | 10% $WO_3$/90% $ZrO_2$ | Impregnation | 1% $Pd/WO_3/ZrO_2$ |
| I-25 | 1% Pd | 10% $WO_3$/90% $TiO_2$ | Impregnation | 1% $Pd/WO_3/TiO_2$ |
| I-26 | 1% Pd | 10% $SiO_2$/90% $Al_2O_3$ | Impregnation | 1% $Pd/SiO_2/Al_2O_3$ |
| I-27 | 1% Pd | MgO | Impregnation | 1% Pd/MgO |
| I-28 | 1% Pd | MgO—$CeO_2$ (1:1) | Impregnation | 1% Pd/MgO-$CeO_2$ |
| I-29 | 1% Pd | H-Y (SAR 30) | Impregnation | 1% Pd/H-Y |
| I-30 | 1% Pd | H-ZSM-5 (SAR 30) | Impregnation | 1% Pd/H-ZSM5 |
| I-31 | 1% Pd | H-Beta (SAR 25) | Impregnation | 1% Pd/H-Beta |
| I-32 | 1% Pd | H-CHA (SAR 29) | Impregnation | 1% Pd/H-CHA |
| I-33 | 1% Pd | $Al_2O_3$/ZSM5 (3:1) | Pd on $Al_2O_3$/ZSM-5, mix with 25% $TiO_2$ | 1% Pd/($Al_2O_3$ + ZSM5) + $TiO_2$ |
| I-34 | 0.2% Pd | $Al_2O_3$/ZSM5 (3:1) | Pd on $Al_2O_3$/ZSM-5, mix with 25% $TiO_2$ | 0.2% Pd/($Al_2O_3$ + ZSM5) + $TiO_2$ |
| I-35 | 1% Rh | $Al_2O_3$ | Impregnation | 1% $Rh/Al_2O_3$ |
| I-36 | 1% Ru | $Al_2O_3$ | Impregnation | 1% $Ru/Al_2O_3$ |
| I-37 | 1% Ir | $Al_2O_3$ | Impregnation | 1% $Ir/Al_2O_3$ |

The catalysts listed in Table 1 include various platinum group metals (PGMs) such as platinum (Pt), palladium (Pd), rhodium (Rh), ruthenium (Ru), and iridium (Ir) supported on oxide or mixed oxide supports. The table also includes selected Pt and Pd catalysts supported on zeolites. SAR following a zeolite name is $SiO_2$ to $Al_2O_3$ molar ratio. SAR 30 means $SiO_2/Al_2O_3=30$.

TABLE 2

Sample Matrix II

| Catalyst ID | Metal | Support |
|---|---|---|
| II-1 | 1% Pt | Mg-Y (SAR 30) (ion exchanged) |
| II-2 | 1% Pt | H-Y (SAR 30) |
| II-3 | 1% Pt | H-Beta (SAR 25) |
| II-4 | 1% Pt | H-CHA (SAR 29) |
| II-5 | 1% Pt | H-ZSM-5 (SAR 30) |
| II-6 | 1% Pt | H-MOR (SAR 20) |
| II-7 | 1% Pt | H-FER (SAR 20) |
| II-8 | 1% Pt | $TiO_2$ |
| II-9 | 1% Pt | $ZrO_2$ |
| II-10 | 1% Pt | 10% MgO/90% $ZrO_2$ |
| II-11 | 1% Pt | MgO |
| II-12 | 1% Pt | 70% MgO/30% $Al_2O_3$ |
| II-13 | 1% Pt/Pd (Pt/Pd = 8:1) | H-Y (SAR 30) |
| II-14 | 1% Pt/Pd (Pt/Pd = 8:1) | H-Beta (SAR 25) |
| II-15 | 1% Pt/Pd (Pt/Pd = 8:1) | H-CHA (SAR 29) |
| II-16 | 1% Pt/Pd (Pt/Pd = 8:1) | H-ZSM-5 (SAR 30) |
| II-17 | 1% Pt/Pd (Pt/Pd = 8:1) | H-MOR (SAR 20) |
| II-18 | 1% Pt/Pd (Pt/Pd = 8:1) | H-FER (SAR 20) |
| II-19 | 1% Pt/Pd (Pt/Pd = 8:1) | $ZrO_2$ |
| II-20 | 1% Pt/Pd (Pt/Pd = 8:1) | $TiO_2$ |
| II-21 | 1% Pt/Pd (Pt/Pd = 4:1) | H-Y (SAR 30) |
| II-22 | 1% Pt/Pd (Pt/Pd = 4:1) | H-Beta (SAR 25) |
| II-23 | 1% Pt/Pd (Pt/Pd = 4:1) | H-CHA (SAR 29) |
| II-24 | 1% Pt/Pd (Pt/Pd = 4:1) | H-ZSM-5 (SAR 30) |
| II-25 | 1% Pt/Pd (Pt/Pd = 4:1) | H-FER (SAR 20) |
| II-26 | 1% Pt/Pd (Pt/Pd = 4:1) | $ZrO_2$ |
| II-27 | 1% Pt/Pd (Pt/Pd = 4:1) | $TiO_2$ |
| II-28 | 1% Pt/Pd (Pt/Pd = 4:1) | MgO |
| II-29 | 1% Pt/Pd (Pt/Pd = 4:1) | 70% MgO/30% $Al_2O_3$ |
| II-30 | 1% Pt/Pd (Pt/Pd = 4:1) | 10% Mg0/90% $ZrO_2$ |
| II-31 | 1% Pt/Pd (Pt/Pd = 2:1) | H-Y (SAR 30) |
| II-32 | 1% Pt/Pd (Pt/Pd = 2:1) | H-Beta (SAR 25) |
| II-33 | 1% Pt/Pd (Pt/Pd = 2:1) | H-CHA (SAR 29) |
| II-34 | 1% Pt/Pd (Pt/Pd = 2:1) | H-ZSM-5 (SAR 30) |
| II-35 | 1% Pt/Pd (Pt/Pd = 2:1) | H-MOR (SAR 20) |
| II-36 | 1% Pt/Pd (Pt/Pd = 2:1) | H-FER (SAR 20) |

TABLE 2-continued

Sample Matrix II

| Catalyst ID | Metal | Support |
|---|---|---|
| II-37 | 1% Pt/Pd (Pt/Pd = 2:1) | $ZrO_2$ |
| II-38 | 1% Pt/Pd (Pt/Pd = 2:1) | $TiO_2$ |
| II-39 | 1% Pd | H-Y (SAR 30) |
| II-40 | 1% Pd | H-MOR (SAR 20) |
| II-41 | 1% Pd | H-FER (SAR 20) |
| II-42 | 1% Pd | $ZrO_2$ |
| II-43 | 1% Pd | $TiO_2$ |
| II-44 | 1% Pd | MgO |
| II-45 | 1% Pd | 70% MgO/30% $Al_2O_3$ |
| II-46 | 1% Pd | 10% MgO/90% $ZrO_2$ |

Table 2 lists Pt, Pd, and PtPd catalysts support on a variety of zeolites. The table also lists a range of Pt/Pd ratios for some catalyst composition, for example Pt/Pd ratios such as 8:1, 4:1, and 2:1.

TABLE 3

Performance of Matrix I samples at 125° C. as a function of inlet [$H_2$]

| | [$H_2$] = 0.2% | | [$H_2$] = 0.4% | | [$H_2$] = 0.6% | | [$H_2$] = 0.8% | |
|---|---|---|---|---|---|---|---|---|
| Cat. ID | $H_2$ conv. (%) | $N_2O$ (ppm) | $H_2$ conv. (%) | $N_2O$ (ppm) | $H_2$ conv. (%) | $N_2O$ (ppm) | $H_2$ conv. (%) | $N_2O$ (ppm) |
| I-1 | 86.6 | 51.0 | 85.4 | 59.7 | 85.1 | 64.5 | 85.1 | 54.7 |
| I-2 | 89.9 | 65.2 | 88.1 | 74.9 | 87.5 | 73.3 | 87.5 | 61.3 |
| I-3 | 1.2 | 1.9 | 0.1 | 3.2 | 0.0 | 8.1 | 0.2 | 2.2 |
| I-4 | 84.9 | 26.9 | 89.4 | 60.7 | 89.0 | 63.8 | 88.9 | 55.4 |
| I-5 | 72.4 | 37.3 | 87.4 | 34.7 | 88.9 | 35.1 | 88.9 | 29.4 |
| I-6 | 92.0 | 37.2 | 91.8 | 38.5 | 91.0 | 49.5 | 90.8 | 45.8 |
| I-7 | 78.8 | 17.8 | 88.4 | 28.7 | 89.8 | 41.6 | 90.2 | 41.2 |
| I-8 | 74.6 | 19.0 | 87.8 | 47.8 | 90.8 | 59.5 | 91.5 | 53.1 |
| I-9 | 92.9 | 50.5 | 93.0 | 59.9 | 92.8 | 62.1 | 92.6 | 51.6 |
| I-10 | 41.9 | 2.3 | 38.4 | 5.6 | 55.8 | 8.1 | 38.6 | 4.4 |
| I-11 | 17.4 | 2.2 | 17.9 | 4.2 | 15.3 | 9.9 | 14.8 | 3.8 |
| I-12 | 13.3 | 2.2 | 12.8 | 4.0 | 9.7 | 9.3 | 8.6 | 3.1 |
| I-13 | 7.4 | 1.7 | 7.4 | 2.7 | 4.4 | 7.4 | 3.2 | 0.9 |
| I-14 | 71.1 | 24.1 | 72.3 | 27.2 | 70.2 | 31.7 | 69.8 | 25.9 |
| I-15 | 82.6 | 35.2 | 82.3 | 36.7 | 80.4 | 44.7 | 80.0 | 38.9 |
| I-16 | 27.9 | 6.9 | 26.8 | 12.8 | 26.6 | 22.4 | 28.5 | 19.4 |
| I-17 | 75.8 | 32.5 | 75.8 | 36.5 | 75.8 | 42.1 | 76.1 | 33.7 |
| I-18 | 76.9 | 0.9 | 79.8 | 1.6 | 80.5 | 6.6 | 81.0 | 6.5 |
| I-19 | 80.6 | 2.2 | 80.1 | 7.2 | 79.3 | 17.2 | 79.2 | 16.2 |
| I-20 | 2.7 | 2.1 | 3.3 | 3.4 | 1.8 | 8.4 | 1.9 | 2.9 |
| I-21 | 87.5 | 3.8 | 86.0 | 6.4 | 85.5 | 26.8 | 85.1 | 29.6 |
| I-22 | 85.0 | 0.8 | 87.5 | 0.4 | 87.4 | 11.7 | 87.2 | 18.7 |
| I-23 | 89.2 | 7.3 | 89.0 | 11.1 | 87.6 | 29.4 | 86.1 | 27.7 |
| I-24 | 88.4 | 1.8 | 89.5 | 2.8 | 89.5 | 9.7 | 89.5 | 15.8 |
| I-25 | 87.0 | 3.4 | 89.7 | 8.2 | 90.5 | 16.4 | 91.1 | 26.0 |
| I-26 | 93.9 | 1.1 | 93.5 | 3.0 | 93.0 | 10.1 | 92.6 | 16.3 |
| I-27 | 68.7 | 11.7 | 78.9 | 21.5 | 84.3 | 32.3 | 84.4 | 27.9 |
| I-28 | 75.6 | 7.8 | 85.2 | 14.5 | 88.6 | 25.2 | 89.5 | 22.0 |
| I-29 | 83.3 | 8.7 | 86.7 | 18.2 | 87.8 | 23.1 | 88.4 | 21.9 |
| I-30 | 82.6 | 3.3 | 84.3 | 9.6 | 84.8 | 12.3 | 85.3 | 11.4 |
| I-31 | 86.5 | 5.5 | 90.9 | 15.3 | 91.4 | 24.1 | 91.5 | 21.7 |
| I-32 | 45.9 | 3.2 | 57.6 | 9.0 | 61.9 | 18.2 | 63.7 | 12.4 |
| I-33 | 94.0 | 1.7 | 94.3 | 3.0 | 94.0 | 9.0 | 93.8 | 19.2 |
| I-34 | 89.0 | 1.8 | 92.4 | 3.1 | 93.2 | 9.8 | 93.6 | 9.7 |
| I-35 | 31.8 | 2.5 | 29.1 | 3.4 | 26.9 | 8.7 | 26.0 | 3.3 |
| I-36 | 21.8 | 2.2 | 18.2 | 2.8 | 16.1 | 7.8 | 16.5 | 2.3 |
| I-37 | 16.3 | 2.0 | 14.2 | 2.6 | 10.4 | 7.5 | 10.9 | 1.9 |

Table 3 shows $H_2$ conversion and $N_2O$ formation of Matrix I samples (shown in Table 1) performed at 125° C. as a function of inlet $H_2$ concentration (0.2%, 0.4%, 0.6% and 0.8%).

TABLE 4

Performance of Matrix I samples with 1% $H_2$ as a function of inlet temperature

| | T = 125° C. | | T = 150° C. | | T = 175° C. | | T = 200° C. | |
|---|---|---|---|---|---|---|---|---|
| Cat. ID | $H_2$ conv. (%) | $N_2O$ (ppm) | $H_2$ conv. (%) | $N_2O$ (ppm) | $H_2$ conv. (%) | $N_2O$ (ppm) | $H_2$ conv. (%) | $N_2O$ (ppm) |
| I-1 | 85.7 | 47.8 | 87.4 | 42.4 | 89.2 | 37.0 | 91.5 | 33.6 |
| I-2 | 88.0 | 54.3 | 89.3 | 50.5 | 90.9 | 48.2 | 92.8 | 44.4 |

TABLE 4-continued

Performance of Matrix I samples with 1% $H_2$ as a function of inlet temperature

| | T = 125° C. | | T = 150° C. | | T = 175° C. | | T = 200° C. | |
|---|---|---|---|---|---|---|---|---|
| Cat. ID | $H_2$ conv. (%) | $N_2O$ (ppm) | $H_2$ conv. (%) | $N_2O$ (ppm) | $H_2$ conv. (%) | $N_2O$ (ppm) | $H_2$ conv. (%) | $N_2O$ (ppm) |
| I-3 | 3.8 | 4.6 | 10.1 | 5.8 | 22.6 | 6.7 | 35.8 | 9.6 |
| I-4 | 89.5 | 52.7 | 90.7 | 49.0 | 92.0 | 46.7 | 93.7 | 42.0 |
| I-5 | 85.3 | 33.6 | 90.4 | 37.8 | 91.9 | 39.4 | 93.9 | 37.9 |
| I-6 | 90.6 | 53.5 | 92.2 | 40.2 | 93.3 | 36.9 | 94.9 | 30.5 |
| I-7 | 90.2 | 41.1 | 91.5 | 39.9 | 92.9 | 34.7 | 94.6 | 27.8 |
| I-8 | 91.8 | 50.6 | 93.1 | 48.6 | 94.2 | 43.5 | 95.6 | 37.0 |
| I-9 | 92.6 | 44.6 | 93.6 | 40.2 | 94.6 | 36.3 | 96.0 | 34.5 |
| I-10 | 37.3 | 5.3 | 51.0 | 3.3 | 69.3 | 1.4 | 90.8 | 7.3 |
| I-11 | 17.6 | 6.8 | 26.5 | 7.3 | 38.7 | 6.6 | 52.0 | 12.7 |
| I-12 | 12.4 | 6.4 | 19.7 | 6.4 | 31.9 | 6.7 | 43.4 | 11.3 |
| I-13 | 7.5 | 3.6 | 12.9 | 4.7 | 19.3 | 5.7 | 28.7 | 7.3 |
| I-14 | 70.7 | 28.0 | 73.9 | 24.3 | 76.5 | 17.3 | 80.4 | 14.4 |
| I-15 | 80.4 | 41.2 | 82.6 | 29.1 | 84.7 | 23.8 | 87.2 | 22.3 |
| I-16 | 29.5 | 19.4 | 83.7 | 15.0 | 88.7 | 13.1 | 90.7 | 17.5 |
| I-17 | 77.1 | 33.7 | 79.5 | 28.5 | 82.5 | 24.3 | 86.0 | 22.7 |
| I-18 | 82.1 | 17.2 | 84.2 | 18.7 | 86.4 | 17.1 | 89.3 | 15.8 |
| I-19 | 79.8 | 23.2 | 89.1 | 28.0 | 91.1 | 28.2 | 92.7 | 34.7 |
| I-20 | 5.2 | 5.1 | 12.8 | 6.7 | 27.4 | 6.9 | 41.9 | 10.9 |
| I-21 | 85.3 | 26.1 | 91.1 | 37.8 | 92.7 | 42.4 | 94.2 | 40.4 |
| I-22 | 87.8 | 30.4 | 92.1 | 30.7 | 93.5 | 25.5 | 95.0 | 17.8 |
| I-23 | 88.0 | 30.3 | 92.3 | 39.9 | 93.8 | 38.9 | 95.3 | 35.7 |
| I-24 | 89.7 | 16.1 | 92.2 | 24.1 | 94.1 | 31.6 | 95.9 | 33.2 |
| I-25 | 91.4 | 33.5 | 93.6 | 37.7 | 95.2 | 48.2 | 96.3 | 47.7 |
| I-26 | 92.9 | 28.0 | 94.6 | 28.6 | 95.7 | 24.3 | 96.8 | 24.5 |
| I-27 | 89.7 | 32.2 | 94.4 | 25.9 | 95.5 | 21.4 | 96.8 | 21.6 |
| I-28 | 91.2 | 29.5 | 93.7 | 30.3 | 95.4 | 27.5 | 97.0 | 23.0 |
| I-29 | 89.7 | 19.1 | 91.7 | 17.4 | 93.5 | 21.3 | 95.4 | 21.4 |
| I-30 | 86.6 | 15.7 | 88.6 | 22.7 | 90.4 | 24.1 | 93.4 | 21.1 |
| I-31 | 92.6 | 23.3 | 94.1 | 20.3 | 95.4 | 26.0 | 96.9 | 28.4 |
| I-32 | 65.2 | 19.4 | 69.1 | 23.1 | 73.9 | 23.6 | 79.1 | 20.7 |
| I-33 | 94.2 | 31.9 | 95.5 | 36.8 | 96.5 | 36.8 | 97.6 | 36.9 |
| I-34 | 94.3 | 22.0 | 95.7 | 27.2 | 96.7 | 31.5 | 97.8 | 34.0 |
| I-35 | 30.5 | 5.4 | 34.2 | 7.1 | 43.3 | 8.8 | 56.5 | 11.9 |
| I-36 | 18.6 | 4.3 | 22.5 | 5.5 | 30.9 | 6.5 | 41.1 | 8.8 |
| I-37 | 14.0 | 3.8 | 16.5 | 4.3 | 23.9 | 5.5 | 31.8 | 7.2 |

Table 4 shows $H_2$ conversion and $N_2O$ formation of Matrix I samples (Table 1) with 1% inlet hydrogen concentration as a function of catalyst inlet temperature (125° C., 150° C., 175° C., and 200° C.).

TABLE 5

Performance of Matrix II samples at 125° C. as a function of inlet [$H_2$]

| | [$H_2$] = 0.2% | | [$H_2$] = 0.4% | | [$H_2$] = 0.6% | | [$H_2$] = 0.8% | |
|---|---|---|---|---|---|---|---|---|
| Cat. ID | $H_2$ conv. (%) | $N_2O$ (ppm) | $H_2$ conv. (%) | $N_2O$ (ppm) | $H_2$ conv. (%) | $N_2O$ (ppm) | $H_2$ conv. (%) | $N_2O$ (ppm) |
| II-1 | 82.7 | 33.2 | 75.9 | 35.1 | 75.6 | 33.7 | 79.0 | 35.1 |
| II-2 | 89.9 | 29.4 | 84.0 | 32.9 | 83.0 | 31.8 | 85.2 | 33.1 |
| II-3 | 43.9 | 18.4 | 87.9 | 23.2 | 87.1 | 19.4 | 88.4 | 19.8 |
| II-4 | 89.1 | 26.9 | 91.3 | 29.3 | 89.8 | 27.9 | 90.7 | 27.4 |
| II-5 | 92.5 | 37.1 | 93.2 | 40.4 | 91.6 | 37.9 | 92.1 | 39.0 |
| II-6 | 96.6 | 31.4 | 94.6 | 39.1 | 92.8 | 37.9 | 93.1 | 38.3 |
| II-7 | 99.3 | 23.5 | 95.7 | 24.9 | 93.7 | 22.0 | 93.8 | 22.3 |
| II-8 | 75.7 | 27.6 | 96.0 | 55.7 | 94.5 | 52.7 | 94.6 | 51.2 |
| II-9 | 99.4 | 45.9 | 95.0 | 45.8 | 93.1 | 42.5 | 93.1 | 42.2 |
| II-10 | 0.3 | 2.6 | 0.0 | 1.5 | 9.5 | 0.2 | 3.7 | 2.5 |
| II-11 | 18.6 | 1.3 | 18.3 | 1.2 | 4.9 | 27.3 | 22.6 | 2.2 |
| II-12 | 12.9 | 8.5 | 11.2 | 19.4 | NA | NA | 28.1 | 33.1 |
| II-13 | 81.9 | 22.8 | 79.5 | 25.6 | 76.3 | 26.0 | 80.4 | 29.4 |
| II-14 | 14.3 | 3.9 | 11.9 | 7.6 | 2.3 | 10.4 | 19.2 | 14.2 |
| II-15 | 82.4 | 31.8 | 78.0 | 38.8 | 74.2 | 38.3 | 77.9 | 39.6 |
| II-16 | 77.5 | 24.3 | 87.2 | 41.9 | 84.1 | 40.3 | 86.0 | 44.4 |
| II-17 | 93.5 | 25.0 | 91.7 | 38.5 | 88.8 | 37.3 | 89.7 | 37.3 |
| II-18 | 98.5 | 24.1 | 94.2 | 25.8 | 91.6 | 23.4 | 92.1 | 24.1 |
| II-19 | 99.8 | 48.3 | 95.3 | 54.5 | 92.3 | 53.0 | 92.7 | 55.1 |
| II-20 | 61.6 | 10.2 | 93.3 | 35.5 | 93.7 | 41.4 | 94.1 | 48.4 |
| II-21 | 55.0 | 25.4 | 97.1 | 26.9 | 95.4 | 27.2 | 95.3 | 29.5 |
| II-22 | 15.4 | 2.7 | 20.6 | 5.7 | 11.8 | 6.7 | 24.4 | 10.0 |

TABLE 5-continued

Performance of Matrix II samples at 125° C. as a function of inlet [H₂]

| | [H₂] = 0.2% | | [H₂] = 0.4% | | [H₂] = 0.6% | | [H₂] = 0.8% | |
| --- | --- | --- | --- | --- | --- | --- | --- | --- |
| Cat. ID | H₂ conv. (%) | N₂O (ppm) | H₂ conv. (%) | N₂O (ppm) | H₂ conv. (%) | N₂O (ppm) | H₂ conv. (%) | N₂O (ppm) |
| II-23 | 82.2 | 35.3 | 86.4 | 37.6 | 82.9 | 34.5 | 84.7 | 35.9 |
| II-24 | 78.6 | 26.2 | 92.1 | 37.7 | 89.1 | 34.4 | 89.8 | 37.8 |
| II-25 | 91.7 | 22.4 | 91.1 | 25.3 | 87.6 | 23.6 | 88.5 | 24.3 |
| II-26 | 96.8 | 43.5 | 96.8 | 52.6 | 93.8 | 54.4 | 93.8 | 61.3 |
| II-27 | 62.2 | 12.5 | 96.1 | 28.4 | 95.0 | 33.6 | 94.9 | 40.1 |
| II-28 | 18.5 | 3.8 | 20.6 | 6.0 | 12.0 | 5.7 | 24.2 | 7.1 |
| II-29 | 20.6 | 3.6 | 21.7 | 14.7 | 16.3 | 21.8 | 29.6 | 26.3 |
| II-30 | 1.9 | 4.7 | 0.0 | 9.2 | NA | NA | 4.7 | 18.5 |
| II-31 | 25.7 | 21.6 | 66.8 | 31.2 | 78.7 | 28.1 | 81.6 | 28.0 |
| II-32 | 10.7 | 2.4 | 13.0 | 5.4 | 0.3 | 4.8 | 18.1 | 8.4 |
| II-33 | 64.0 | 38.8 | 80.5 | 36.8 | 78.0 | 24.9 | 80.4 | 34.8 |
| II-34 | 70.9 | 26.2 | 88.0 | 34.0 | 86.2 | 23.2 | 87.2 | 35.3 |
| II-35 | 86.4 | 31.4 | 92.5 | 33.7 | 90.7 | 23.6 | 90.9 | 31.4 |
| II-36 | 96.9 | 25.3 | 95.9 | 28. | 93.6 | 25.0 | 93.3 | 28.4 |
| II-37 | 93.8 | 23.4 | 97.6 | 41.8 | 95.4 | 43.4 | 94.7 | 50.5 |
| II-38 | 72.0 | 9.1 | 94.6 | 19.1 | 95.4 | 22.4 | 95.2 | 30.4 |
| II-39 | 55.5 | 4.9 | 48.6 | 16.9 | 36.1 | 23.8 | 41.7 | 31.7 |
| II-40 | 78.7 | 4.4 | 81.5 | 16.6 | 77.3 | 26.5 | 77.9 | 35.8 |
| II-41 | 44.1 | 3.4 | 42.7 | 13.9 | 34.9 | 19.7 | 38.1 | 18.7 |
| II-42 | 73.6 | 4.5 | 74.1 | 12.8 | 72.4 | 24.3 | 71.4 | 29.8 |
| II-43 | 85.5 | 5.0 | 88.9 | 7.5 | 87.9 | 18.0 | 87.6 | 26.4 |
| II-44 | 19.5 | 0.6 | 15.4 | 0.5 | 6.4 | 0.0 | 18.2 | 0.9 |
| II-45 | 5.6 | 0.7 | 4.6 | 0.0 | NA | NA | 8.7 | 0.3 |
| II-46 | 12.4 | 9.9 | 4.0 | 9.4 | NA | NA | 0.2 | 6.9 |

Table 5 shows H₂ conversion and N₂O formation of Matrix II samples (shown in Table 2) performed at 125° C. as a function of inlet H₂ concentration (0.2%, 0.4%, 0.6% and 0.8%).

TABLE 6

Performance of Matrix II samples with 1% H₂ as a function of inlet temperature

| | T = 125° C. | | T = 150° C. | | T = 175° C. | | T = 200° C. | |
| --- | --- | --- | --- | --- | --- | --- | --- | --- |
| Cat. ID | H₂ conv. (%) | N₂O (ppm) | H₂ conv. (%) | N₂O (ppm) | H₂ conv. (%) | N₂O (ppm) | H₂ conv. (%) | N₂O (ppm) |
| II-1 | 78.4 | 41.4 | 82.2 | 35.2 | 83.9 | 23.2 | 86.4 | 19.3 |
| II-2 | 84.5 | 41.7 | 87.8 | 33.7 | 89.5 | 22.8 | 91.4 | 18.8 |
| II-3 | 87.8 | 23.5 | 91.0 | 17.3 | 92.5 | 20.1 | 94.1 | 21.7 |
| II-4 | 89.9 | 35.1 | 93.0 | 19.6 | 94.2 | 15.3 | 95.7 | 14.4 |
| II-5 | 91.3 | 41.1 | 94.2 | 30.7 | 95.4 | 27.6 | 96.8 | 24.6 |
| II-6 | 92.3 | 44.9 | 95.1 | 30.3 | 96.2 | 27.4 | 97.4 | 25.9 |
| II-7 | 93.0 | 27.5 | 95.7 | 16.9 | 96.7 | 16.3 | 98.0 | 17.6 |
| II-8 | 93.9 | 49.3 | 96.4 | 45.2 | 97.3 | 41.2 | 98.5 | 35.6 |
| II-9 | 92.1 | 44.3 | 94.8 | 39.3 | 95.8 | 39.2 | 97.5 | 35.1 |
| II-10 | 2.8 | 4.4 | 7.4 | 7.4 | 17.7 | 8.7 | 39.8 | 11.9 |
| II-11 | 19.2 | 4.2 | 24.8 | 7.2 | 35.8 | 8.6 | 65.0 | 10.5 |
| II-12 | 11.3 | 22.9 | 68.1 | 28.1 | 88.2 | 23.1 | 93.8 | 20.5 |
| II-13 | 77.1 | 36.4 | 88.2 | 26.8 | 92.5 | 14.5 | 96.2 | 15.2 |
| II-14 | 13.6 | 18.4 | 72.7 | 17.8 | 92.3 | 23.9 | 97.4 | 36.4 |
| II-15 | 75.9 | 46.6 | 89.0 | 27.2 | 94.4 | 21.5 | 97.7 | 20.9 |
| II-16 | 84.4 | 46.5 | 93.1 | 25.8 | 96.7 | 25.0 | 98.7 | 25.8 |
| II-17 | 88.4 | 34.0 | 94.9 | 20.2 | 97.4 | 18.4 | 99.1 | 18.4 |
| II-18 | 91.0 | 29.8 | 96.0 | 15.5 | 98.0 | 12.4 | 99.5 | 11.0 |
| II-19 | 91.6 | 55.8 | 95.7 | 54.7 | 97.6 | 51.1 | 99.3 | 40.7 |
| II-20 | 93.5 | 53.5 | 97.0 | 47.3 | 98.5 | 49.6 | 99.7 | 45.2 |
| II-21 | 94.1 | 34.5 | 97.5 | 20.7 | 98.9 | 15.6 | 100.0 | 16.7 |
| II-22 | 22.7 | 13.4 | 30.9 | 12.2 | 72.2 | 15.1 | 96.4 | 24.8 |
| II-23 | 83.7 | 37.1 | 87.3 | 18.0 | 95.1 | 12.7 | 99.7 | 11.4 |
| II-24 | 88.8 | 40.3 | 92.0 | 22.4 | 97.0 | 21.3 | 100.0 | 25.1 |
| II-25 | 87.8 | 34.6 | 90.5 | 17.4 | 94.0 | 12.9 | 96.5 | 11.0 |
| II-26 | 92.9 | 55.2 | 95.5 | 55.9 | 98.2 | 55.7 | 99.9 | 45.0 |
| II-27 | 93.9 | 41.4 | 96.6 | 32.0 | 98.7 | 43.8 | 100.0 | 50.8 |
| II-28 | 20.9 | 10.4 | 24.9 | 12.1 | 35.0 | 14.3 | 60.0 | 23.0 |
| II-29 | 18.5 | 20.7 | 53.5 | 23.3 | 82.9 | 33.3 | 91.9 | 42.2 |
| II-30 | 0.9 | 11.9 | 8.4 | 11.7 | 26.5 | 15.7 | 79.9 | 28.7 |
| II-31 | 78.1 | 27.8 | 86.5 | 13.4 | 92.9 | 17.3 | 96.8 | 21.5 |

TABLE 6-continued

Performance of Matrix II samples with 1% $H_2$ as a function of inlet temperature

| | T = 125° C. | | T = 150° C. | | T = 175° C. | | T = 200° C. | |
|---|---|---|---|---|---|---|---|---|
| Cat. ID | $H_2$ conv. (%) | $N_2O$ (ppm) | $H_2$ conv. (%) | $N_2O$ (ppm) | $H_2$ conv. (%) | $N_2O$ (ppm) | $H_2$ conv. (%) | $N_2O$ (ppm) |
| II-32 | 14.5 | 14.6 | 29.0 | 11.0 | 91.3 | 11.6 | 97.7 | 26.0 |
| II-33 | 78.9 | 43.8 | 84.2 | 14.2 | 96.4 | 8.5 | 99.3 | 11.9 |
| II-34 | 86.0 | 38.7 | 90.0 | 19.3 | 97.7 | 22.4 | 99.8 | 28.9 |
| II-35 | 89.9 | 35.5 | 93.1 | 15.6 | 98.5 | 14.1 | 100.0 | 19.2 |
| II-36 | 92.3 | 35.1 | 95.1 | 19.8 | 99.2 | 19.2 | 100.0 | 20.3 |
| II-37 | 93.7 | 47.2 | 96.2 | 60.9 | 99.4 | 63.3 | 100.0 | 60.4 |
| II-38 | 94.7 | 36.2 | 97.0 | 34.7 | 99.7 | 57.5 | 100.0 | 64.2 |
| II-39 | 93.0 | 22.5 | 96.3 | 11.2 | 98.8 | 12.8 | 100.0 | 18.5 |
| II-40 | 94.6 | 38.8 | 97.6 | 9.9 | 99.7 | 8.0 | 100.0 | 21.7 |
| II-41 | 50.2 | 34.0 | 92.5 | 18.7 | 96.9 | 15.1 | 98.7 | 16.7 |
| II-42 | 87.8 | 36.8 | 97.3 | 45.1 | 99.8 | 45.3 | 100.0 | 41.0 |
| II-43 | 92.0 | 27.5 | 97.9 | 41.1 | 100.0 | 44.6 | 100.0 | 45.3 |
| II-44 | 19.4 | 2.7 | 23.6 | 3.3 | 28.0 | 4.1 | 35.0 | 6.9 |
| II-45 | 8.4 | 2.2 | 13.0 | 3.5 | 16.2 | 3.8 | 27.3 | 6.5 |
| II-46 | 70.9 | 34.8 | 74.8 | 31.0 | 80.3 | 39.2 | 91.2 | 42.9 |

Table 6 shows $H_2$ conversion and $N_2O$ oxide formation of Matrix II samples (Table 2) with 1% inlet hydrogen concentration as a function of catalyst inlet temperature (125° C., 150° C., 175° C. and 200° C.).

Figure 2:
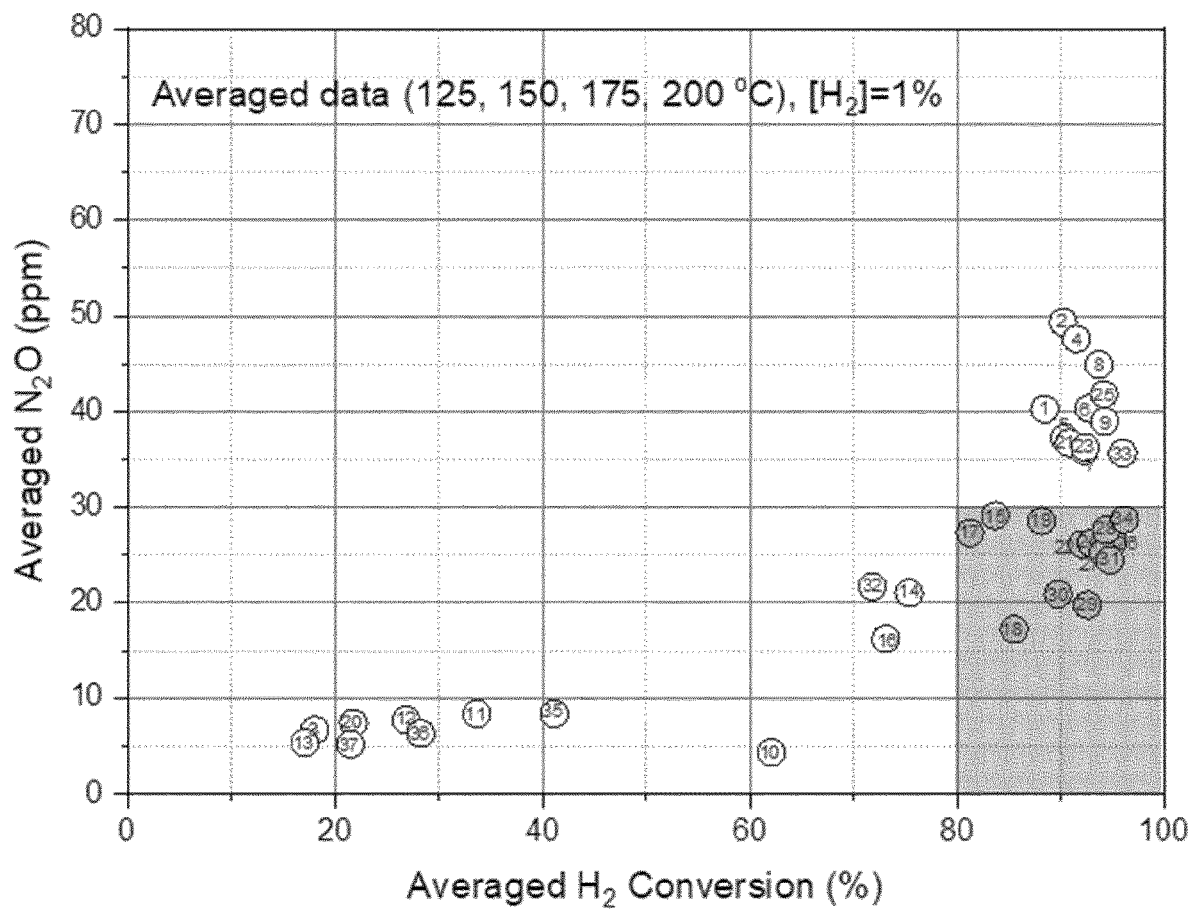
FIG. 2 shows exemplary catalysts of the present disclosure, as described in Table 1, below, within a certain performance boundary (80-100% $H_2$ conversion and <30 ppm $N_2O$).

The performance results of the samples shown in Table 1, which are tabulated in Table 4, are summarized in FIG. 2 as a correlation between the average $N_2O$ formation and average $H_2$ conversion over four temperatures (125, 150, 175 and 200° C.) with 1% inlet $H_2$ concentration. FIG. 2 shows that, within a certain performance boundary (80-100% $H_2$ conversion and <30 ppm $N_2O$), catalysts such as for example, Pd/$Al_2O_3$, Pd/H—Y, Pd/H-ZSM-5, Pd/H-Beta, Pd/MgO, Pd/$SiO_2$/$Al_2O_3$, Pd/$WO_3$/$ZrO_2$, Pd/$ZrO_2$, Pd/MgO—$CeO_2$, Pd/($Al_2O_3$+ZSM-5)+$TiO_2$, Pd/$SiO_2$, Pt/H-ZSM-5, and Pt/H-CHA show enhanced catalytic performance.

Figure 3:
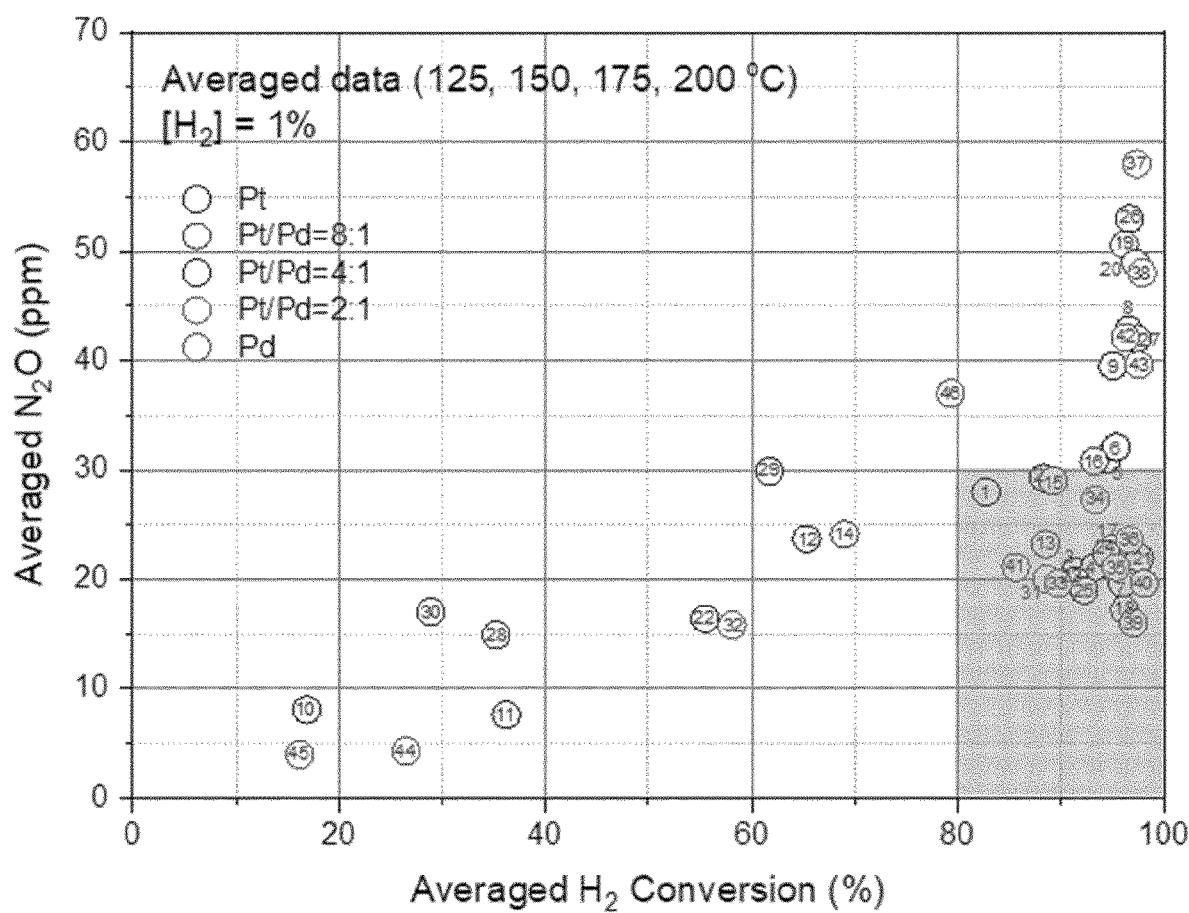
FIG. 3 shows exemplary catalysts of the present disclosure, as described in Table 2, below, within a certain performance boundary (80-100% $H_2$ conversion and <30 ppm $N_2O$).

The performance results of the samples shown in Table 2, which are tabulated in Table 6, are summarized in FIG. 3 as a correlation between the average $N_2O$ formation and average $H_2$ conversion over four temperatures (125, 150, 175 and 200° C.) with 1% inlet $H_2$ concentration. FIG. 3 shows that Pt, Pd, and Pt/Pd catalysts supported on zeolites, such as Y, FER, MOR, CHA, *BEA, and MFI, are highly active for hydrogen oxidation with conversions between 80-100% and $N_2O$ formation <30 ppm.

EMBODIMENTS

The present invention is further illustrated by the following set of embodiments and combinations of embodiments resulting from the dependencies and back-references as indicated. In particular, it is noted that in each instance where a range of embodiments is mentioned, for example in the context of a term such as "The catalyst of any one of embodiments 1 to 4", every embodiment in this range is meant to be explicitly disclosed for the skilled person, i.e. the wording of this term is to be understood by the skilled person as being synonymous to "The catalyst of any one of embodiments 1, 2, 3, and 4". Further, it is explicitly noted that the following set of embodiments is not the set of claims determining the extent of protection, but represents a suitably structured part of the description directed to general and preferred aspects of the present invention:

1. A hydrogen oxidation catalyst for exhaust gas treatment of hydrogen from a combustion engine comprising a platinum group metal supported on a zeolite.
2. The hydrogen oxidation catalyst according to embodiment 1, wherein the platinum group metal is chosen from Pt, Pd, rhodium (Rh), ruthenium (Ru), iridium (Ir), or combinations thereof.
3. The hydrogen oxidation catalyst according to embodiment 1, wherein the platinum group metal is Pt.
4. The hydrogen oxidation catalyst according to embodiment 1, wherein the platinum group metal is Pd.
5. The hydrogen oxidation catalyst according to embodiment 1, wherein the platinum group metal is a combination of Pt and Pd.
6. The hydrogen oxidation catalyst according to embodiment 1, wherein the platinum group metal is Rh.
7. The hydrogen oxidation catalyst according to embodiment 1, wherein the platinum group metal is Ru.
8. The hydrogen oxidation catalyst according to embodiment 1, wherein the platinum group metal is Ir.
9. The hydrogen oxidation catalyst according to any one of embodiments 1-8, wherein the zeolite is an H-form zeolite chosen from structures comprising FAU, MOR, CHA, FER, *BEA, MFI, ($Al_2O_3$+MFI)+$TiO_2$, and combinations thereof.
10. The hydrogen oxidation catalyst according to embodiment 9, wherein the zeolite structure is FAU.
11. The hydrogen oxidation catalyst according to embodiment 9, wherein the zeolite structure is MOR.
12. The hydrogen oxidation catalyst according to embodiment 9, wherein the zeolite structure is CHA.
13. The hydrogen oxidation catalyst according to embodiment 9, wherein the zeolite structure is FER.
14. The hydrogen oxidation catalyst according to embodiment 9, wherein the zeolite structure is *BEA.
15. The hydrogen oxidation catalyst according to embodiment 9, wherein the zeolite structure is MFI.
16. The hydrogen oxidation catalyst according to embodiment 9, wherein the zeolite structure is ($Al_2O_3$+MFI)+$TiO_2$.
17. The hydrogen oxidation catalyst according to any one of embodiments 1-16, wherein the hydrogen oxidation catalyst is chosen from Pd/H—Y, Pd/H-ZSM-5, Pd/H-Mordenite, Pd/H-Beta, Pd/H-Chabazite, Pd/H-Ferrierite, Pd/($Al_2O_3$+ZSM-5)+$TiO_2$, Pt/H—Y, Pt/H-ZSM-5, Pt/H-Mordenite, Pt/H-Beta, Pt/H-Chabazite, Pt/H-Ferrierite, Pt/($Al_2O_3$+ZSM-5)+$TiO_2$, PtPd/H—Y, PtPd/H-

ZSM-5, PtPd/H-Mordenite, PtPd/H-Beta, PtPd/H-Chabazite, PtPd/H-Ferrierite, and PtPd/($Al_2O_3$+ZSM-5)+$TiO_2$.

18. The hydrogen oxidation catalyst according to any one of embodiments 1-16, wherein the hydrogen oxidation catalyst is Pd/H—Y.

19. The hydrogen oxidation catalyst according to any one of embodiments 1-16, wherein the hydrogen oxidation catalyst is Pd/H-ZSM-5.

20. The hydrogen oxidation catalyst according to any one of embodiments 1-16, wherein the hydrogen oxidation catalyst is Pd/H-Mordenite.

21. The hydrogen oxidation catalyst according to any one of embodiments 1-16, wherein the hydrogen oxidation catalyst is Pd/H-Beta.

22. The hydrogen oxidation catalyst according to any one of embodiments 1-16, wherein the hydrogen oxidation catalyst is Pd/H-Chabazite.

23. The hydrogen oxidation catalyst according to any one of embodiments 1-16, wherein the hydrogen oxidation catalyst is Pd/H-Ferrierite.

24. The hydrogen oxidation catalyst according to any one of embodiments 1-16, wherein the hydrogen oxidation catalyst is Pd/($Al_2O_3$+ZSM-5)+$TiO_2$.

25. The hydrogen oxidation catalyst according to any one of embodiments 1-16, wherein the hydrogen oxidation catalyst is Pt/H—Y.

26. The hydrogen oxidation catalyst according to any one of embodiments 1-16, wherein the hydrogen oxidation catalyst is Pt/H-ZSM-5.

27. The hydrogen oxidation catalyst according to any one of embodiments 1-16, wherein the hydrogen oxidation catalyst is Pt/H-Mordenite.

28. The hydrogen oxidation catalyst according to any one of embodiments 1-16, wherein the hydrogen oxidation catalyst is Pt/H-Beta.

29. The hydrogen oxidation catalyst according to any one of embodiments 1-16, wherein the hydrogen oxidation catalyst is Pt/H-Chabazite.

30. The hydrogen oxidation catalyst according to any one of embodiments 1-16, wherein the hydrogen oxidation catalyst is Pt/H-Ferrierite.

31. The hydrogen oxidation catalyst according to any one of embodiments 1-16, wherein the hydrogen oxidation catalyst is Pt/($Al_2O_3$+ZSM-5)+$TiO_2$.

32. The hydrogen oxidation catalyst according to any one of embodiments 1-16, wherein the hydrogen oxidation catalyst is PtPd/H—Y.

33. The hydrogen oxidation catalyst according to any one of embodiments 1-16, wherein the hydrogen oxidation catalyst is PtPd/H-ZSM-5.

34. The hydrogen oxidation catalyst according to any one of embodiments 1-16, wherein the hydrogen oxidation catalyst is PtPd/H-Mordenite.

35. The hydrogen oxidation catalyst according to any one of embodiments 1-16, wherein the hydrogen oxidation catalyst is PtPd/H-Beta.

36. The hydrogen oxidation catalyst according to any one of embodiments 1-16, wherein the hydrogen oxidation catalyst is PtPd/H-Chabazite.

37. The hydrogen oxidation catalyst according to any one of embodiments 1-16, wherein the hydrogen oxidation catalyst is PtPd/H-Ferrierite.

38. The hydrogen oxidation catalyst according to any one of embodiments 1-16, wherein the hydrogen oxidation catalyst is PtPd/($Al_2O_3$+ZSM-5)+$TiO_2$.

39. The hydrogen oxidation catalyst of according to any one of embodiments 1-16 and 32-38, wherein the Pt: Pd weight ratio is chosen from 8:1, 4:1, and 2:1.

40. The hydrogen oxidation catalyst of according to any one of embodiments 1-16 and 32-38, wherein the Pt: Pd weight ratio is 8:1.

41. The hydrogen oxidation catalyst of according to any one of embodiments 1-16 and 32-38, wherein the Pt: Pd weight ratio is 4:1.

42. The hydrogen oxidation catalyst of according to any one of embodiments 1-16 and 32-38, wherein the Pt: Pd weight ratio is 2:1.

43. A hydrogen oxidation catalyst for exhaust gas treatment of hydrogen from a combustion engine comprising platinum (Pt), palladium (Pd), or combinations thereof supported on an oxide or a mixed oxide.

44. The hydrogen oxidation catalyst according to embodiment 43, wherein the oxide or the mixed oxide is chosen from $Al_2O_3$, $SiO_2$, $CeO_2$, $TiO_2$, $ZrO_2$, MgO, $WO_3$, and mixtures thereof.

45. The hydrogen oxidation catalyst according to embodiment 43 or 44, wherein the oxide or the mixed oxide is $Al_2O_3$.

46. The hydrogen oxidation catalyst according to embodiment 43 or 44, wherein the oxide or the mixed oxide is $SiO_2$.

47. The hydrogen oxidation catalyst according to embodiment 43 or 44, wherein the oxide or the mixed oxide is $CeO_2$.

48. The hydrogen oxidation catalyst according to embodiment 43 or 44, wherein the oxide or the mixed oxide is $TiO_2$.

49. The hydrogen oxidation catalyst according to embodiment 43 or 44, wherein the oxide or the mixed oxide is $ZrO_2$.

50. The hydrogen oxidation catalyst according to embodiment 43 or 44, wherein the oxide or the mixed oxide is MgO.

51. The hydrogen oxidation catalyst according to embodiment 43 or 44, wherein the oxide or the mixed oxide is $WO_3$.

52. The hydrogen oxidation catalyst according to embodiment 43 or 44, wherein the oxide or the mixed oxide is $Al_2O_3$/$SiO_2$.

53. The hydrogen oxidation catalyst according to embodiment 43 or 44, wherein the oxide or the mixed oxide is $WO_3$/$ZrO_2$.

54. The hydrogen oxidation catalyst according to embodiment 43 or 44, wherein the oxide or the mixed oxide is MgO/$CeO_2$.

55. The hydrogen oxidation catalyst according to embodiment 43 or 44, wherein the oxide or the mixed oxide is $WO_3$/$ZrO_2$.

56. The hydrogen oxidation catalyst according to any one of embodiments 43-55, wherein the hydrogen oxidation catalyst is chosen from Pd/$Al_2O_3$, Pd/MgO, Pd/$SiO_2$/$Al_2O_3$, Pd/$WO_3$/$ZrO_2$, Pd/$ZrO_2$, Pd/MgO—$CeO_2$, Pd/$SiO_2$, Pt/$Al_2O_3$, Pt/MgO, Pt/$SiO_2$/$Al_2O_3$, Pt/$WO_3$/$ZrO_2$, Pt/$ZrO_2$, Pt/MgO—$CeO_2$, Pt/$SiO_2$, PtPd/$Al_2O_3$, PtPd/MgO, PtPd/$SiO_2$/$Al_2O_3$, PtPd/$WO_3$/$ZrO_2$, PtPd/$ZrO_2$, PtPd/MgO—$CeO_2$, and PtPd/$SiO_2$.

57. The hydrogen oxidation catalyst according to any one of embodiments 43-55, wherein the hydrogen oxidation catalyst is Pd/$Al_2O_3$.

58. The hydrogen oxidation catalyst according to any one of embodiments 43-55, wherein the hydrogen oxidation catalyst is Pd/MgO.

59. The hydrogen oxidation catalyst according to any one of embodiments 43-55, wherein the hydrogen oxidation catalyst is Pd/SiO$_2$/Al$_2$O$_3$.
60. The hydrogen oxidation catalyst according to any one of embodiments 43-55, wherein the hydrogen oxidation catalyst is Pd/WO$_3$/ZrO$_2$.
61. The hydrogen oxidation catalyst according to any one of embodiments 43-55, wherein the hydrogen oxidation catalyst is Pd/ZrO$_2$.
62. The hydrogen oxidation catalyst according to any one of embodiments 43-55, wherein the hydrogen oxidation catalyst is Pd/MgO—CeO$_2$.
63. The hydrogen oxidation catalyst according to any one of embodiments 43-55, wherein the hydrogen oxidation catalyst is Pd/SiO$_2$.
64. The hydrogen oxidation catalyst according to any one of embodiments 43-55, wherein the hydrogen oxidation catalyst is Pt/Al$_2$O$_3$.
65. The hydrogen oxidation catalyst according to any one of embodiments 43-55, wherein the hydrogen oxidation catalyst is Pt/MgO.
66. The hydrogen oxidation catalyst according to any one of embodiments 43-55, wherein the hydrogen oxidation catalyst is Pt/SiO$_2$/Al$_2$O$_3$.
67. The hydrogen oxidation catalyst according to any one of embodiments 43-55, wherein the hydrogen oxidation catalyst is Pt/WO$_3$/ZrO$_2$.
68. The hydrogen oxidation catalyst according to any one of embodiments 43-55, wherein the hydrogen oxidation catalyst is Pt/ZrO$_2$.
69. The hydrogen oxidation catalyst according to any one of embodiments 43-55, wherein the hydrogen oxidation catalyst is Pt/MgO—CeO$_2$.
70. The hydrogen oxidation catalyst according to any one of embodiments 43-55, wherein the hydrogen oxidation catalyst is Pt/SiO$_2$.
71. The hydrogen oxidation catalyst according to any one of embodiments 43-55, wherein the hydrogen oxidation catalyst is PtPd/Al$_2$O$_3$.
72. The hydrogen oxidation catalyst according to any one of embodiments 43-55, wherein the hydrogen oxidation catalyst is PtPd/MgO.
73. The hydrogen oxidation catalyst according to any one of embodiments 43-55, wherein the hydrogen oxidation catalyst is PtPd/SiO$_2$/Al$_2$O$_3$.
74. The hydrogen oxidation catalyst according to any one of embodiments 43-55, wherein the hydrogen oxidation catalyst is PtPd/WO$_3$/ZrO$_2$.
75. The hydrogen oxidation catalyst according to any one of embodiments 43-55, wherein the hydrogen oxidation catalyst is PtPd/ZrO$_2$.
76. The hydrogen oxidation catalyst according to any one of embodiments 43-55, wherein the hydrogen oxidation catalyst is PtPd/MgO—CeO$_2$.
77. The hydrogen oxidation catalyst according to any one of embodiments 43-55, wherein the hydrogen oxidation catalyst is PtPd/SiO$_2$.
78. The hydrogen oxidation catalyst of according to any one of claims 43-77, wherein the Pt: Pd weight ratio is chosen from 8:1, 4:1, and 2:1.
79. The hydrogen oxidation catalyst of according to any one of embodiments 43-77, wherein the Pt: Pd weight ratio is chosen from 8:1, 4:1, and 2:1.
80. The hydrogen oxidation catalyst of according to any one of embodiments 43-77, wherein the Pt: Pd weight ratio is 8:1.
81. The hydrogen oxidation catalyst of according to any one of embodiments 43-77, wherein the Pt: Pd weight ratio is 4:1.
82. The hydrogen oxidation catalyst of according to any one of embodiments 43-77, wherein the Pt: Pd weight ratio is 2:1.
83. An emission treatment system for a combustion engine, comprising a hydrogen injector positioned upstream of the hydrogen oxidation catalyst according to any one of embodiments 1-82, wherein the hydrogen oxidation catalyst is positioned upstream of one or more of a NO oxidation catalyst, a selective catalytic reduction (SCR) catalyst, an ammonia oxidation (AMOX) catalyst, or any combination thereof.
84. An emission treatment system for a combustion engine, comprising a hydrogen injector positioned upstream of the hydrogen oxidation catalyst according to any one of embodiments 1-82, wherein the hydrogen oxidation catalyst is positioned upstream of a NO oxidation catalyst.
85. An emission treatment system for a combustion engine, comprising a hydrogen injector positioned upstream of the hydrogen oxidation catalyst according to any one of embodiments 1-82, wherein the hydrogen oxidation catalyst is positioned upstream of a selective catalytic reduction (SCR) catalyst.
86. An emission treatment system for a combustion engine, comprising a hydrogen injector positioned upstream of the hydrogen oxidation catalyst according to any one of embodiments 1-82, wherein the hydrogen oxidation catalyst is positioned upstream of an ammonia oxidation (AMOX) catalyst.
87. An emission treatment system for a combustion engine, comprising a hydrogen injector positioned upstream of the hydrogen oxidation catalyst according to any one of embodiments 1-82, wherein the hydrogen oxidation catalyst is positioned upstream of a combination of a selective catalytic reduction (SCR) catalyst and an ammonia oxidation (AMOX) catalyst.
88. A method for heat generation in an engine exhaust system, the method comprising injecting hydrogen gas into the emission treatment system according to any one of embodiments 83-87, at a temperature ranging from about 100° C. to about 250° C., allowing the hydrogen oxidation catalyst to oxidize the hydrogen gas, and raising the temperature of the engine exhaust system downstream of the hydrogen oxidation system.
89. A method for heat generation in an engine exhaust system, the method comprising injecting hydrogen gas into the emission treatment system according to any one of embodiments 83-87, at a temperature of about 100° C., allowing the hydrogen oxidation catalyst to oxidize the hydrogen gas, and raising the temperature of the engine exhaust system downstream of the hydrogen oxidation system.
90. A method for heat generation in an engine exhaust system, the method comprising injecting hydrogen gas into the emission treatment system according to any one of embodiments 83-87, at a temperature of about 150° C., allowing the hydrogen oxidation catalyst to oxidize the hydrogen gas, and raising the temperature of the engine exhaust system downstream of the hydrogen oxidation system.
91. A method for heat generation in an engine exhaust system, the method comprising injecting hydrogen gas into the emission treatment system according to any one of embodiments 83-87, at a temperature of about 200° C., allowing the hydrogen oxidation catalyst to oxidize the hydrogen gas, and raising the temperature of the engine exhaust system downstream of the hydrogen oxidation system.

92. A method for heat generation in an engine exhaust system, the method comprising injecting hydrogen gas into the emission treatment system according to any one of embodiments 83-87, at a temperature of about 250° C., allowing the hydrogen oxidation catalyst to oxidize the hydrogen gas, and raising the temperature of the engine exhaust system downstream of the hydrogen oxidation system.

93. An emission treatment system for a combustion engine, comprising a hydrogen injector positioned upstream of a hydrogen oxidation catalyst and an NO oxidation catalyst, wherein the hydrogen oxidation catalyst and the NO oxidation catalyst are combined, wherein the hydrogen oxidation catalyst comprises a platinum group metal supported on a zeolite.

94. The emission treatment system for a combustion engine according to embodiment 93, wherein the hydrogen oxidation catalyst is selected from the group consisting of $Pd/Al_2O_3$, Pd/H—Y, Pd/H-ZSM-5, Pd/H-Beta, Pd/MgO, $Pd/SiO_2/Al_2O_3$, $Pd/WO_3/ZrO_2$, $Pd/ZrO_2$, $Pd/MgO$—$CeO_2$, $Pd/(Al_2O_3+ZSM-5)+TiO_2$, $Pd/SiO_2$, Pt/H-ZSM-5, and Pt/H-CHA.

95. The emission treatment system for a combustion engine according to embodiment 93 or 94, wherein an $N_2O$ formation of the emission treatment system is <30 ppm.

96. A method for heat generation in an engine exhaust system, the engine exhaust system comprising an emission treatment system, the method comprising injecting hydrogen gas into an emission treatment system comprising a hydrogen injector positioned upstream of a hydrogen oxidation catalyst at a temperature ranging from about 100° C. to about 250° C., allowing the hydrogen oxidation catalyst to oxidize the hydrogen gas, and raising the temperature of the engine exhaust system downstream of the hydrogen oxidation system, wherein the hydrogen oxidation catalyst comprises a platinum group metal supported on a zeolite,
wherein the hydrogen oxidation catalyst is positioned upstream of one or more of a NO oxidation catalyst, a selective catalytic reduction (SCR) catalyst, an ammonia oxidation (AMOX) catalyst, or any combination thereof, and
wherein an $N_2O$ formation of the emission treatment system is <30 ppm.

97. The method for heat generation according to embodiment 96, wherein the hydrogen oxidation catalyst is selected from the group consisting of $Pd/Al_2O_3$, Pd/H—Y, Pd/H-ZSM-5, Pd/H-Beta, Pd/MgO, $Pd/SiO_2/Al_2O_3$, $Pd/WO_3/ZrO_2$, $Pd/ZrO_2$, $Pd/MgO$—$CeO_2$, $Pd/(Al_2O_3+ZSM-5)+TiO_2$, $Pd/SiO_2$, Pt/H-ZSM-5, and Pt/H-CHA.

98. The method for heat generation according to embodiment 96 or 97, wherein the emission treatment system comprises the hydrogen oxidation catalyst and an NO oxidation catalyst, and wherein the hydrogen oxidation catalyst and the NO oxidation catalyst are combined.

99. The method for heat generation according to any one of embodiments 96 to 98, wherein the $H_2$ conversion of the hydrogen oxidation catalyst is in a range of 80-100%.

100. The method for heat generation according to any one of embodiments 96 to 99, wherein inlet $H_2$ concentration into the emission treatment system is from 0.1 to 2%.

101. Use of a hydrogen oxidation catalyst for oxidizing hydrogen gas in an emission treatment system comprising a hydrogen injector positioned upstream of the hydrogen oxidation catalyst, wherein an $N_2O$ formation of the emission treatment system is <30 ppm, and wherein the hydrogen oxidation catalyst comprises a platinum group metal supported on a zeolite.

102. Use of a hydrogen oxidation catalyst for oxidizing hydrogen gas according to embodiment 101, wherein the hydrogen oxidation catalyst is selected from the group consisting of $Pd/Al_2O_3$, Pd/H—Y, Pd/H-ZSM-5, Pd/H-Beta, Pd/MgO, $Pd/SiO_2/Al_2O_3$, $Pd/WO_3/ZrO_2$, $Pd/ZrO_2$, $Pd/MgO$—$CeO_2$, $Pd/(Al_2O_3+ZSM-5)+TiO_2$, $Pd/SiO_2$, Pt/H-ZSM-5, and Pt/H-CHA.

103. Use of a hydrogen oxidation catalyst for oxidizing hydrogen gas according to embodiment 101 or 102, wherein the wherein the $H_2$ conversion of the hydrogen oxidation catalyst is in a range of 80-100%.

104. Use of a hydrogen oxidation catalyst for oxidizing hydrogen gas according to any one of embodiments 101 to 103, wherein the emission treatment system comprises the hydrogen oxidation catalyst and an NO oxidation catalyst, and wherein the hydrogen oxidation catalyst and the NO oxidation catalyst are combined.

Claims or descriptions that include "or" or "and/or" between at least one member of a group are considered satisfied if one, more than one, or all of the group members are present in, employed in, or otherwise relevant to a given product, process, or system unless indicated to the contrary or otherwise evident from the context. The disclosure includes embodiments in which exactly one member of the group is present in, employed in, or otherwise relevant to a given product, process, or system. The disclosure includes embodiments in which more than one, or all the group members are present in, employed in, or otherwise relevant to a given product, process, or system.

Furthermore, the disclosure encompasses all variations, combinations, and permutations in which at least one limitation, element, clause, and descriptive term from at least one of the listed claims is introduced into another claim. For example, any claim that is dependent on another claim can be modified to include at least one limitation found in any other claim that is dependent on the same base claim. Where elements are presented as lists, such as, e.g., in Markush group format, each subgroup of the elements is also disclosed, and any element(s) can be removed from the group. It should be understood that, in general, where the disclosure, or aspects of the disclosure, is/are referred to as comprising particular elements and/or features, embodiments of the disclosure or aspects of the disclosure consist, or consist essentially of, such elements and/or features. For purposes of simplicity, those embodiments have not been specifically set forth in haec verba herein. Where ranges are given, endpoints are included. Furthermore, unless otherwise indicated or otherwise evident from the context and understanding of one of ordinary skill in the art, values that are expressed as ranges can assume any specific value or sub range within the stated ranges in different embodiments of the disclosure, unless the context clearly dictates otherwise.

Those of ordinary skill in the art will recognize or be able to ascertain using no more than routine experimentation, many equivalents to the specific embodiments of the disclosure described herein. Such equivalents are intended to be encompassed by the claims.

What is claimed is:

1. An emission treatment system for a combustion engine, comprising a hydrogen injector positioned upstream of a hydrogen oxidation catalyst at a temperature ranging from about 100° C. to about 250° C. and an NO oxidation catalyst, wherein the hydrogen oxidation catalyst and the NO oxidation catalyst are combined, and wherein the hydrogen oxidation catalyst comprises a platinum group metal supported on a zeolite;
   wherein the hydrogen oxidation catalyst is positioned upstream of one or more of a NO oxidation catalyst, a selective catalytic reduction (SCR) catalyst, an ammonia oxidation (AMOX) catalyst, or any combination thereof;
   wherein an $N_2O$ formation of the emission treatment system is <30 ppm; and
   wherein the $H_2$ conversion of the hydrogen oxidation catalyst is in a range of 80-100%.

2. The emission treatment system for a combustion engine according to claim 1, wherein the hydrogen oxidation catalyst is selected from the group consisting of $Pd/Al_2O_3$, Pd/H—Y, Pd/H-ZSM-5, Pd/H-Beta, Pd/MgO, $Pd/SiO_2/Al_2O_3$, $Pd/WO_3/ZrO_2$, $Pd/ZrO_2$, $Pd/MgO$—$CeO_2$, $Pd/(Al_2O_3+ZSM-5)+TiO_2$, $Pd/SiO_2$, Pt/H-ZSM-5, and Pt/H-CHA.

3. A method for heat generation in an engine exhaust system, the engine exhaust system comprising an emission treatment system, the method comprising injecting hydrogen gas into an emission treatment system comprising a hydrogen injector positioned upstream of a hydrogen oxidation catalyst at a temperature ranging from about 100° C. to about 250° C., allowing the hydrogen oxidation catalyst to oxidize the hydrogen gas, and raising the temperature of the engine exhaust system downstream of the hydrogen oxidation system,
   wherein the hydrogen oxidation catalyst comprises a platinum group metal supported on a zeolite,
   wherein the hydrogen oxidation catalyst is positioned upstream of one or more of a NO oxidation catalyst, a selective catalytic reduction (SCR) catalyst, an ammonia oxidation (AMOX) catalyst, or any combination thereof, and
   wherein an $N_2O$ formation of the emission treatment system is <30 ppm.

4. The method for heat generation according to claim 3, wherein the hydrogen oxidation catalyst is selected from the group consisting of $Pd/Al_2O_3$, Pd/H—Y, Pd/H-ZSM-5, Pd/H-Beta, Pd/MgO, $Pd/SiO_2/Al_2O_3$, $Pd/WO_3/ZrO_2$, $Pd/ZrO_2$, $Pd/MgO$—$CeO_2$, $Pd/(Al_2O_3+ZSM-5)+TiO_2$, $Pd/SiO_2$, Pt/H-ZSM-5, and Pt/H-CHA.

5. The method for heat generation according to claim 3, wherein the emission treatment system comprises the hydrogen oxidation catalyst and an NO oxidation catalyst, and wherein the hydrogen oxidation catalyst and the NO oxidation catalyst are combined.

6. The method for heat generation according to claim 3, wherein the $H_2$ conversion of the hydrogen oxidation catalyst is in a range of 80-100%.

7. The method for heat generation according to claim 3, wherein inlet $H_2$ concentration into the emission treatment system is from 0.1 to 2%.

8. A use of a hydrogen oxidation catalyst for oxidizing hydrogen gas in an emission treatment system comprising a hydrogen injector positioned upstream of the hydrogen oxidation catalyst at a temperature ranging from about 100° C. to about 250° C., wherein the hydrogen oxidation catalyst is positioned upstream of one or more of a NO oxidation catalyst, a selective catalytic reduction (SCR) catalyst, an ammonia oxidation (AMOX) catalyst, or any combination thereof; wherein an $N_2O$ formation of the emission treatment system is <30 ppm, wherein the hydrogen oxidation catalyst comprises a platinum group metal supported on a zeolite; and
   wherein the $H_2$ conversion of the hydrogen oxidation catalyst is in a range of 80-100%.

9. The use of a hydrogen oxidation catalyst for oxidizing hydrogen gas according to claim 8, wherein the hydrogen oxidation catalyst is selected from the group consisting of $Pd/Al_2O_3$, Pd/H—Y, Pd/H-ZSM-5, Pd/H-Beta, Pd/MgO, $Pd/SiO_2/Al_2O_3$, $Pd/WO_3/ZrO_2$, $Pd/ZrO_2$, $Pd/MgO$—$CeO_2$, $Pd/(Al_2O_3+ZSM-5)+TiO_2$, $Pd/SiO_2$, Pt/H-ZSM-5, and Pt/H-CHA.

10. The use of a hydrogen oxidation catalyst for oxidizing hydrogen gas according to claim 8, wherein the emission treatment system comprises the hydrogen oxidation catalyst and an NO oxidation catalyst, and wherein the hydrogen oxidation catalyst and the NO oxidation catalyst are combined.

* * * * *